US009948493B2

(12) United States Patent
Fargano et al.

(10) Patent No.: US 9,948,493 B2
(45) Date of Patent: *Apr. 17, 2018

(54) NETWORK FUNCTIONS VIRTUALIZATION INTERCONNECTION GATEWAY

(71) Applicant: CenturyLink Intellectual Property LLC, Denver, CO (US)

(72) Inventors: Michael J. Fargano, Louisville, CO (US); Charles I. Cook, Louisville, CO (US); Kevin M. McBride, Lone Tree, CO (US); William O'Brien, Jr., Aurora, CO (US); John McManus, Englewood, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 481 days.

This patent is subject to a terminal disclaimer.

(21) Appl. No.: 14/678,208

(22) Filed: Apr. 3, 2015

(65) Prior Publication Data
US 2015/0288541 A1    Oct. 8, 2015

Related U.S. Application Data

(60) Provisional application No. 61/974,927, filed on Apr. 3, 2014, provisional application No. 61/974,930, filed
(Continued)

(51) Int. Cl.
*H04L 29/06* (2006.01)
*H04L 12/26* (2006.01)
(Continued)

(52) U.S. Cl.
CPC .... *H04L 29/06224* (2013.01); *G06F 9/45558* (2013.01); *G06F 9/50* (2013.01);
(Continued)

(58) Field of Classification Search
CPC ....... H04L 49/354; H04L 49/70; H04L 41/18; H04L 41/5096; H04L 12/4625;
(Continued)

(56) References Cited

U.S. PATENT DOCUMENTS 6,182,275 B1    1/2001  Beelitz et al.
6,427,150 B1    7/2002  Oashi
(Continued)

FOREIGN PATENT DOCUMENTS

EP           2017711 A     1/2008
KR    10-2012-0060014 A    6/2012
(Continued)

OTHER PUBLICATIONS

Batalle, Josep, et al.; "On the Implementation of NFV over an Open Flow Infrastructure: Routing Function Virtualization" ; Nov. 11, 2013; 6 pages.
(Continued)

*Primary Examiner* — Ramy M Osman
(74) *Attorney, Agent, or Firm* — Swanson & Bratschun, L.L.C.

(57) ABSTRACT

Novel tools and techniques might provide for implementing interconnection gateway and/or hub functionalities between two or more network functions virtualization ("NFV") entities that are located in different networks. In some embodiments, a NFV interconnection gateway ("NFVIG") might receive a set of network interconnection information from each of two or more sets of NFV entities, each set of NFV entities being located within a network separate from the networks in which the other sets of NFV entities are located. The NFVIG might be located in one of these networks. The NFVIG might abstract each set of network interconnection information, and might establish one or more links between the two or more sets of NFV entities, based at least in part
(Continued)

on the abstracted sets of network interconnection information. The NFVIG might provide access to one or more virtualized network functions ("VNFs") via the one or more links.

38 Claims, 18 Drawing Sheets

Related U.S. Application Data on Apr. 3, 2014, provisional application No. 61/976,896, filed on Apr. 8, 2014, provisional application No. 61/977,820, filed on Apr. 10, 2014.

(51) Int. Cl.
| | |
|---|---|
| G06F 9/50 | (2006.01) |
| H04L 12/931 | (2013.01) |
| G06F 9/455 | (2018.01) |
| H04L 29/08 | (2006.01) |
| H04L 12/46 | (2006.01) |
| H04L 12/24 | (2006.01) |

(52) U.S. Cl.
CPC ........ G06F 9/5077 (2013.01); H04L 12/4625 (2013.01); H04L 12/4641 (2013.01); H04L 41/0823 (2013.01); H04L 41/0896 (2013.01); H04L 41/5054 (2013.01); H04L 41/5096 (2013.01); H04L 43/08 (2013.01); H04L 49/354 (2013.01); H04L 65/103 (2013.01); H04L 67/141 (2013.01); *G06F 2009/45595* (2013.01); *Y04S 40/162* (2013.01); *Y04S 40/168* (2013.01)

(58) Field of Classification Search
CPC ........... H04L 12/4641; H04L 29/06224; G06F 9/5077; G06F 9/45533; G06F 9/45558; G06F 9/50
See application file for complete search history.

(56) References Cited

U.S. PATENT DOCUMENTS

| | | | |
|---|---|---|---|
| 6,560,641 B1 | 5/2003 | Powderly et al. | |
| 6,577,327 B1 | 6/2003 | Rochford et al. | |
| 7,672,923 B1 | 3/2010 | Reed | |
| 7,953,865 B1 | 5/2011 | Miller et al. | |
| 8,051,382 B1 | 11/2011 | Kingdom et al. | |
| 8,103,480 B2 | 1/2012 | Korn et al. | |
| 9,141,416 B2* | 9/2015 | Bugenhagen | G06F 9/45533 |
| 9,185,170 B1 | 11/2015 | Grammel et al. | |
| 9,356,883 B1 | 5/2016 | Borthakur | |
| 9,386,001 B1* | 7/2016 | Marquardt | G06F 9/45558 |
| 9,417,902 B1 | 8/2016 | Noonan | |
| 9,430,259 B2* | 8/2016 | Bugenhagen | G06F 9/5077 |
| 9,658,868 B2* | 5/2017 | Hill | H04L 67/16 |
| 2002/0152305 A1 | 10/2002 | Jackson et al. | |
| 2003/0055919 A1 | 3/2003 | Fong | |
| 2005/0144288 A1 | 6/2005 | Liao | |
| 2006/0233144 A1* | 10/2006 | Matsumoto | H04L 63/104 |
| | | | 370/338 |
| 2006/0235973 A1 | 10/2006 | McBride et al. | |
| 2007/0094085 A1 | 4/2007 | Redmond et al. | |
| 2007/0230358 A1 | 10/2007 | Narayanan et al. | |
| 2008/0049639 A1 | 2/2008 | Wiley et al. | |
| 2008/0052387 A1 | 2/2008 | Heinz et al. | |
| 2008/0259794 A1 | 10/2008 | Zou et al. | |
| 2009/0187654 A1 | 7/2009 | Raja et al. | |
| 2009/0204965 A1 | 8/2009 | Tanaka et al. | |
| 2010/0027552 A1* | 2/2010 | Hill | G06F 9/45558 |
| | | | 370/401 |
| 2010/0043068 A1 | 2/2010 | Varadhan et al. | |
| 2010/0100640 A1 | 4/2010 | Nakao | |
| 2010/0217837 A1 | 8/2010 | Ansari | |
| 2010/0235580 A1 | 9/2010 | Bouvier | |
| 2010/0306763 A1 | 12/2010 | Lambert et al. | |
| 2011/0134930 A1 | 6/2011 | McLaren | |
| 2011/0310899 A1 | 12/2011 | Alkhatib et al. | |
| 2012/0042040 A1 | 2/2012 | Bailey et al. | |
| 2012/0089845 A1 | 4/2012 | Raleigh | |
| 2012/0151087 A1 | 6/2012 | Azam | |
| 2012/0151277 A1 | 6/2012 | Jung et al. | |
| 2012/0307684 A1 | 12/2012 | Biswas et al. | |
| 2013/0061297 A1 | 3/2013 | Larsen et al. | |
| 2013/0147906 A1 | 6/2013 | Weiser et al. | |
| 2013/0191850 A1 | 7/2013 | Fischer et al. | |
| 2013/0204971 A1 | 8/2013 | Brandywine et al. | |
| 2013/0227670 A1 | 8/2013 | Ahmad et al. | |
| 2013/0262652 A1 | 10/2013 | Vuhk et al. | |
| 2014/0189050 A1 | 7/2014 | Rijsman et al. | |
| 2014/0201374 A1* | 7/2014 | Ashwood-Smith | H04L 49/70 |
| | | | 709/226 |
| 2014/0280499 A1 | 9/2014 | Basavaiah et al. | |
| 2014/0307744 A1 | 10/2014 | Dunbar et al. | |
| 2014/0313984 A1 | 10/2014 | Diamond et al. | |
| 2015/0074793 A1* | 3/2015 | Dalvi | H04L 49/354 |
| | | | 726/15 |
| 2015/0088825 A1 | 3/2015 | Bloom et al. | |
| 2015/0089331 A1* | 3/2015 | Skerry | G06F 9/45533 |
| | | | 714/799 |
| 2015/0143368 A1 | 5/2015 | Bugenhagen | |
| 2015/0150020 A1 | 5/2015 | Duttagupta et al. | |
| 2015/0288622 A1 | 10/2015 | Fargano et al. | |
| 2015/0288767 A1 | 10/2015 | Fargano et al. | |
| 2016/0006696 A1 | 1/2016 | Donley et al. | |
| 2016/0050159 A1 | 2/2016 | Cook et al. | |
| 2016/0301668 A1* | 10/2016 | Marquardt | H04L 49/70 |
| 2016/0337206 A1 | 11/2016 | Bugenhagen et al. | |
| 2016/0337270 A1* | 11/2016 | Heinonen | H04L 49/70 |
| 2017/0093750 A1 | 3/2017 | McBride et al. | |

FOREIGN PATENT DOCUMENTS

| | | |
|---|---|---|
| KR | 2013-0093717 A | 8/2013 |
| KR | 10-1475925 B1 | 12/2014 |
| WO | WO-2014/110453 | 7/2014 |
| WO | WO-2015-126430 A1 | 8/2015 |
| WO | WO-2016/025501 | 2/2016 |
| WO | WO 2017/023396 A1 | 2/2017 |
| WO | WO-2017/058350 A1 | 4/2017 |
| WO | WO-2017/062344 A1 | 4/2017 |
| WO | WO-2017-146768 A1 | 8/2017 |

OTHER PUBLICATIONS

International Application No. PCT/US2015/044690; International Preliminary Report on Patentability dated Feb. 23, 2017; 9 pages.
International Search Report and Written Opinion prepared by the Korean Intellectual Property Office as International Searching Authority for PCT Intl Patent App. No. PCT/US2016/055293 dated Jan. 11, 2017; 12 pages.
Metzler, Jim et al.; "The 2013 Guide to Network Virtualization and SDN"; https://www.avaya.com/en/documents/the_2013_guide_to-network_virtualization_and_sdn.pdf; Dec. 2013; 6 pages.
U.S. Appl. No. 14/678,280; Non-Final Rejection dated Mar. 21, 2017, 94 pages.
U.S. Appl. No. 14/730,695; Final Rejection dated Mar. 29, 2017, 27 pages.
LightReading (Mar. 17, 2015). "RAD Launches vCPE Platform for Hosting VNFs." Web Site www.lightreading.com/nfv/nfv-elements/rad-launches-vcpe-platform-for-hosting-vnfs. Accessed Sep. 8, 2015, 1 page.
Gowan, Bo. (Jun. 22, 2015) "Ciena unveils a carrier-grade CPE for NFV." Web Site www.ciena.com/connect/blog/Ciena-unveils-a-carrier-grade-CPE-for-NFV.html. Accessed Sep. 8, 2015, 4 pages.
International Application No. PCT/US2016/044882; International Search Report and Written Opinion dated Nov. 7, 2016; 11 pages.

(56) References Cited

OTHER PUBLICATIONS

International Search Report and Written Opinion prepared by the Korean Intellectual Property Office as International Searching Authority for PCT Intl Patent App. No. PCT/US2016/044867; 13 pages.
U.S. Appl. No. 14/730,695; Non-Final Rejection dated Dec. 2, 2016; 27 pages.
ETSI Group Specification (Oct. 2013), "Network Functions Virtualisation (NFV); Use Cases"; 50 pages.
U.S. Appl. No. 14/678,309; Non-Final Rejection dated Jun. 16, 2017; 26 pages.
Wikipedia (Oct. 2014), "Network Functions Virtualization" http://en.wikipedia.org/wiki/Network_Functions_virtualization; accessed on Oct. 23, 2014; 5 pages.
International Application No. PCT/US2015/044690; International Search Report and Written Opinion dated Dec. 4, 2015; 12 pages.
U.S. Appl. No. 14/678,309; Notice of Allowance dated Jul. 13, 2017; 19 pages.
U.S. Appl. No. 14/730,695; Non-Final Rejection dated Aug. 11, 2017 26 pages.
U.S. Appl. No. 14/983,884; Notice of Allowance dated Jul. 28, 2017; 30 pages.

* cited by examiner

NETWORK FUNCTIONS VIRTUALIZATION INTERCONNECTION GATEWAY

CROSS-REFERENCES TO RELATED APPLICATIONS

This application claims priority to U.S. Patent Application Ser. No. 61/974,927 (the "'927 Application"), filed Apr. 3, 2014 by Michael J. Fargano, entitled, "Network Functions Virtualization Interconnection Gateway," U.S. Patent Application Ser. No. 61/974,930 (the "'930 Application"), filed Apr. 3, 2014 by Michael J. Fargano, entitled, "Network Functions Virtualization Interconnection Hub," U.S. Patent Application Ser. No. 61/976,896 (the "'896 Application"), filed Apr. 8, 2014 by Michael J. Fargano, entitled, "Customer Environment Network Functions Virtualization (NFV)," and to U.S. Patent Application Ser. No. 61/977,820 (the "'820 application"), filed Apr. 10, 2014 by Michael J. Fargano, entitled, "Customer Environment Network Functions Virtualization (NFV)."

This application is also related to U.S. patent application Ser. No. 14/678,280, filed on a date even herewith by Michael J. Fargano et al., entitled, "Network Functions Virtualization Interconnection Hub," and U.S. patent application Ser. No. 14/678,309, filed on a date even herewith by Michael J. Fargano et al., entitled, "Customer Environment Network Functions Virtualization (NFV)."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and computer software for implementing interconnection gateway and/or hub functionalities, and, in particular embodiments, to methods, systems, and computer software for implementing interconnection gateway and/or hub functionalities between or among two or more network functions virtualization ("NFV") entities that are located in different networks.

BACKGROUND

Although currently available network gateway devices and network hub devices allow for interconnection between or among two or more networks and network components therein, such interconnection is for conventional data traffic. Such currently available network gateway or hub devices, however, do not provide for interconnection between or amongst two or more network functions virtualization ("NFV") entities in corresponding two or more different networks, much less provide access to one or more virtualized network functions ("VNFs") via such interconnections.

Hence, there is a need for more robust and scalable solutions for implementing interconnection gateway and/or hub functionalities, by, e.g., implementing interconnection gateway and/or hub functionalities between or among two or more network functions virtualization ("NFV") entities that are located in different networks.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1A:
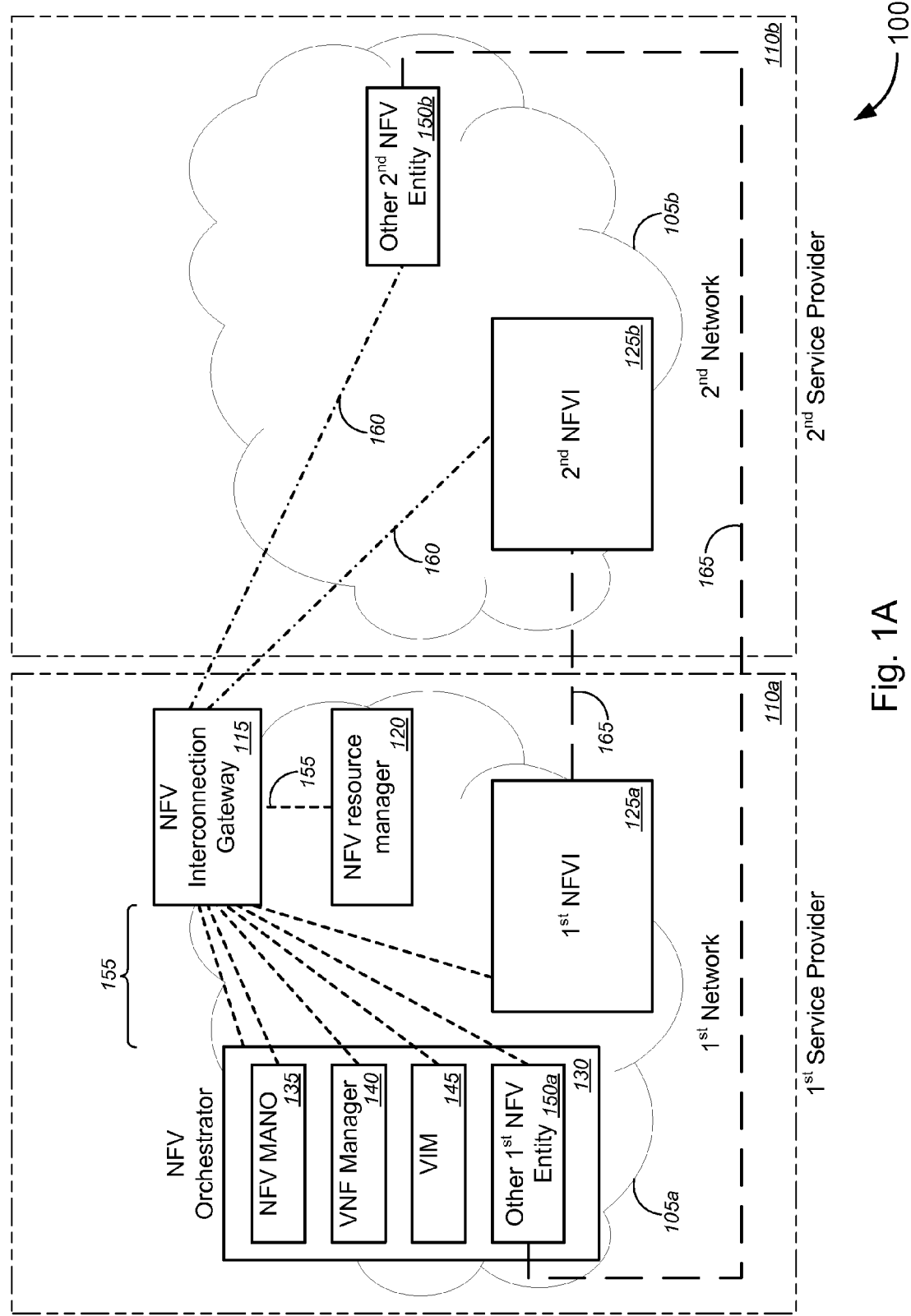
FIGS. 1A and 1B are schematic diagrams illustrating various systems for implementing interconnection gateway functionality between a first set of network functions virtualization ("NFV") entities in a first network and a second set of NFV entities in a second network, in accordance with various embodiments.

Various embodiments provide techniques for implementing interconnection gateway and/or hub functionalities between or among two or more network functions virtualization ("NFV") entities that are located in different networks.

In some embodiments, a NFV interconnection gateway ("NFVIG")—which provides NFV interconnection between two networks of two separate (network) service providers in a one-to-one manner—might receive a set of network interconnection information from each of two or more sets of NFV entities, each set of NFV entities being located within a network separate from the networks in which the other sets of NFV entities are located. The NFVIG might, in some cases, be located in one of these networks. The NFVIG might abstract each set of network interconnection information, and might establish one or more links between the two or more sets of NFV entities, based at least in part on the abstracted sets of network interconnection information. The NFVIG might provide access to one or more virtualized network functions ("VNFs") via the one or more links.

In some cases, a NFV entity might include, without limitation, at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, a domain orchestrator, and/or the like. In some instances, one or more NFV entities might include a device that is configured to request execution of VNFs and to access the VNFs being executed on corresponding one of the one or more other NFV entities, without capacity and/or capability to locally execute the VNFs. Herein, "lack of capacity" might imply to resources are exhausted due to load, while "lack of capability" might imply that the service provider does not have resources to locally execute the VNFs in the first place. In some instances, a service provider that owns, manages, or controls a particular VNF may offer the particular VNF to other service providers only if the particular VNF is executed on its own NFVI. The NFVIG, in some aspects, might include, but is not limited to, a physical gateway device, a gateway application hosted on a distributed computing platform, a gateway application hosted on a cloud computing platform, a VNF-based gateway application hosted on a centralized gateway hardware system, a gateway application hosted on a server, a VNF-based gateway application hosted on a computing device, an external network-to-network interface ("E-NNI") device, and/or the like. In some cases, the network connection information might include, without limitation, information regarding at least one of latency, jitter, bandwidth, packet loss, nodal connectivity, compute resources, storage resources, memory capacity, routing, operations support systems ("OSS"), or business support systems ("BSS"), additional services (e.g., firewall, security, parental control functionality, etc.), and/or information regarding at least one of fault, configuration, accounting, performance, or security ("FCAPS"), and/or the like.

According to some aspects, providing access to the one or more VNFs might include, without limitation, sending one or more VNFs from one set of NFV entities in one network to another set of NFV entities in another network via the one or more links, providing one set of NFV entities in one network with access to one or more VNFs running on another set of NFV entities in another network without sending the one or more VNFs from the one set of NFV entities to the another set of NFV entities, providing access to the one or more VNFs via a NFVIG, providing access to the one or more VNFs via peering connection between one set of NFV entities in one network and another set of NFV entities in another network, bursting one or more VNFs from one set of NFV entities in one network to another set of NFV entities in another network using an application programming interface ("API"), and/or the like.

According to some embodiments, a NFV interconnection hub ("NFVIH")—which provides NFV interconnection amongst three or more networks of three or more separate (network) service providers in a many-to-many manner—might receive a set of network interconnection information from each of three or more sets of NFV entities, each set of NFV entities being located within a network separate from the networks in which the other sets of NFV entities are located. The NFVIH might be located within a separate external network. The NFVIH might abstract each set of network interconnection information, and might establish one or more links among the three or more sets of NFV entities, based at least in part on the abstracted sets of network interconnection information. The NFVIH might provide access to one or more VNFs via the one or more links. In some aspects, the NFVIH might provide hub-to-hub NFV interconnection between or amongst large groups of separate networks (with each group being interconnected by a hub), to allow for expanded scalability in NFV interconnection or the like.

In some cases, a NFV entity might include, without limitation, at least one of a NFV orchestrator, a NFVI system, a NFV MANO system, a VNF manager, a NFV resource manager, a VIM, a VM, a macro orchestrator, a domain orchestrator, and/or the like. In some instances, one or more NFV entities might include a device that is configured to request execution of VNFs and to access the VNFs being executed on corresponding one of the one or more other NFV entities, without capacity and/or capability to locally execute the VNFs. As above, "lack of capacity" might imply to resources are exhausted due to load, while "lack of capability" might imply that the service provider does not have resources to locally execute the VNFs in the first place. In some instances, a service provider that owns, manages, or controls a particular VNF may offer the particular VNF to other service providers only if the particular VNF is executed on its own NFVI. The NFVIH, in some aspects, might include, but is not limited to, a physical hub device, a hub application hosted on a distributed computing platform, a hub application hosted on a cloud computing platform, a VNF-based hub application hosted on a centralized hub hardware system, a hub application hosted on a server, a VNF-based hub application hosted on a computing device, an E-NNI device, and/or the like. In some cases, the network connection information might include, without limitation, information regarding at least one of latency, jitter, bandwidth, packet loss, nodal connectivity, compute resources, storage resources, memory capacity, routing, OSS, or BSS, additional services (e.g., firewall, security, parental control functionality, etc.), and/or information regarding at least one of fault, configuration, accounting, performance, or security ("FCAPS"), and/or the like.

According to some aspects, providing access to the one or more VNFs might include, without limitation, sending one or more VNFs from one set of NFV entities in one network to another set of NFV entities in another network via the one or more links, providing one set of NFV entities in one network with access to one or more VNFs running on another set of NFV entities in another network without sending the one or more VNFs from the one set of NFV entities to the another set of NFV entities, providing access to the one or more VNFs via a NFVIH (in some cases, via one or more NFVIGs), providing access to the one or more VNFs via peering connection between one set of NFV entities in one network and another set of NFV entities in another network, bursting one or more VNFs from one set of NFV entities in one network to another set of NFV entities in another network using an API, and/or the like.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like.

Various embodiments described herein, while embodying (in some cases) software products, computer-performed methods, and/or computer systems, represent tangible, concrete improvements to existing technological areas, including, without limitation, network communications technology, network virtualization technology, network configuration technology, and/or the like. In other aspects, certain embodiments, can improve the functioning of a computer or network system itself (e.g., computing devices or systems that form parts of the network, computing devices or systems for performing the functionalities described below, etc.), for example, by enabling implementation of network functions virtualization ("NFV") interconnection between two or more sets of NFV entities in two or more separate networks or amongst three or more sets of NFV entities in three or more separate networks, enabling access to virtual network functions ("VNFs") via such NFV interconnection, enabling implementation of virtual gateway and/or hub functionalities for performing one or more of these implementations, enabling implementation of virtualization functionalities for performing one or more of these implementations, improving network and/or computing system functionalities, improving network and/or computing system efficiencies, and/or the like. In particular, to the extent any abstract concepts are present in the various embodiments, those concepts can be implemented as described herein by devices, software, systems, and methods that involve specific novel functionality (e.g., steps or operations), such as implementing NFV interconnection between two or more sets of NFV entities in two or more separate networks or amongst three or more sets of NFV entities in three or more separate networks, providing an NFV entity with access to VNFs via such NFV interconnection, implementing virtualization functionalities for performing these implementations, enabling NFVaaS functionality or VNFaaS functionality for enabling a 3rd party provider to access VNFs via such NFV interconnection, and/or the like, to name a few examples, that extend beyond mere conventional computer processing operations. These functionalities can produce tangible results outside of the implementing computer system, including, merely by way of example, improved network and/or computing system operations, improved network and/or computing system operation efficiencies, and/or the like, any of which may be observed or measured by customers and/or service providers.

In an aspect, a method might comprise receiving, with an interconnection gateway device within a first network and from one or more internal network functions virtualization ("NFV") entities, a first set of network connection information, each of the one or more internal NFV entities being located within the first network. The method might also comprise receiving, with the interconnection gateway device and from one or more external NFV entities, a second set of network connection information, each of the one or more external NFV entities being located within a second network external to the first network. The method might further comprise abstracting, with the interconnection gateway device, the first set of network connection information to generate a first set of abstracted network connection information and abstracting, with the interconnection gateway device, the second set of network connection information to generate a second set of abstracted network connection information. Each of the first set of abstracted network connection information and the second set of abstracted network connection information might be abstracted to be independent of any particular NFV entity in any network. The method might additionally comprise establishing, with the interconnection gateway device, one or more links between each of the one or more internal NFV entities and each corresponding one of the one or more external NFV entities, based at least in part on one or more of the first set of abstracted network connection information or the second set of abstracted network connection information. The method might further comprise providing access to one or more virtualized network functions ("VNFs") via the one or more links.

According to some embodiments, the first network might be associated with a first service provider, and the second network might be associated with a second service provider separate from the first service provider. In some cases, the one or more links might be established between the first service provider and the second service provider to establish interconnection for providing at least one of customer roaming services, customer nomadic services, wholesale play, disaster recovery, offloading, service bureau operations, or network operator/service provider cooperation, and/or the like.

In some embodiments, providing access to the one or more VNFs via the one or more links might comprise sending one or more VNFs from one of the one or more internal NFV entities or the one or more external NFV entities to the other of the one or more internal NFV entities or the one or more external NFV entities, via the one or more links. Alternatively, providing access to the one or more VNFs via the one or more links might comprise providing at least one of the one or more internal NFV entities or the one or more external NFV entities with access to one or more VNFs running on the other of the one or more internal NFV entities or the one or more external NFV entities, without sending the one or more VNFs from the other of the one or more internal NFV entities or the one or more external NFV entities to the one of the one or more internal NFV entities or the one or more external NFV entities. In some embodiments, providing access to the one or more VNFs via the one or more links might comprise providing, via the interconnection gateway device, access to one or more VNFs via the one or more links. In other embodiments, providing access to the one or more VNFs via the one or more links might comprise providing access to one or more VNFs, via peering connection between each of the one or more internal NFV entities and a corresponding one of the one or more external NFV entities. In yet other embodiments, providing access to the one or more VNFs via the one or more links might comprise bursting, using an application programming interface ("API"), one or more VNFs from one of the one or more internal NFV entities or the one or more external NFV entities to another of the one or more internal NFV entities or the one or more external NFV entities.

Merely by way of example, in some instances, each of the one or more internal NFV entities might comprise at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like. In some cases, each of the one or more external NFV entities might comprise at least one of a NFV orchestrator, a NFVI system, a NFV MANO system, a VNF manager, a NFV resource manager, a VIM, a VM, a macro orchestrator, or a domain orchestrator, and/or the like. In some embodiments, each of the one or more external NFV entities might comprise a device that is configured to request execution of VNFs and to access the VNFs being executed on corresponding one of the one or more internal NFV entities, without at least one of capacity or capability to locally execute the VNFs.

According to some embodiments, the interconnection gateway device might comprise a physical gateway device, a gateway application hosted on a distributed computing platform, a gateway application hosted on a cloud computing platform, a VNF-based gateway application hosted on a centralized gateway hardware system, a gateway application hosted on a server, a VNF-based gateway application hosted on a computing device, or an external network-to-network interface ("E-NNI") device. In some cases, the first set of network connection information might comprise information regarding at least one of latency, jitter, bandwidth, packet loss, nodal connectivity, compute resources, storage resources, memory capacity, routing, operations support systems ("OSS"), or business support systems ("BSS"), and/or the like, while the second set of network connection information might comprise information regarding at least one of latency, jitter, bandwidth, packet loss, nodal connectivity, compute resources, storage resources, memory capacity, routing, OSS, or BSS, and/or the like. In some instances, the first set of network connection information might comprise information regarding at least one of fault, configuration, accounting, performance, or security ("FCAPS"), while the second set of network connection information might comprise information regarding at least one of fault, configuration, accounting, performance, or security ("FCAPS").

In various embodiments, the method might further comprise bursting at least one VNF of the one or more VNFs from a first pod to a second pod, based at least in part on one or more of time of day, geographic information, expected usage throughout a day, expected changes in usage throughout a day, one or more performance characteristics, or changes in one or more performance characteristics. Each of the first pod and the second pod might comprise physical hardware resources that are part of one of an internal NFV entity of the one or more internal NFV entities or an external NFV entity of the one or more external NFV entities.

In some embodiments, the method might further comprise service chaining two or more VNFs together to provide a single network service. In some cases, the two or more VNFs might comprise at least one first service chained VNF provided by at least one internal NFV entity of the one or more internal NFV entities and at least one second service chained VNF provided by at least one external NFV entity of the one or more external NFV entities, and service chaining the two or more VNFs together to provide a single network service might comprise service chaining the at least one first service chained VNF and the at least one second service chained VNF together to provide the single network service. In some instances, the two or more VNFs might comprise two or more service chained VNFs provided by only one of at least one internal NFV entity of the one or more internal NFV entities or at least one external NFV entity of the one or more external NFV entities, and service chaining the two or more VNFs together to provide a single network service might comprise service chaining the two or more service chained VNFs provided by only one of at least one internal NFV entity of the one or more internal NFV entities or at least one external NFV entity of the one or more external NFV entities.

In some cases, the method might further comprise sending, with the interconnection gateway device and to at least one of the one or more external NFV entities, a service catalog indicating at least one of a plurality of VNFs, a plurality of application programming interfaces ("APIs"), or a plurality of services offered by the one or more internal NFV entities. According to some embodiments, receiving the second set of network connection information might comprise receiving, with the interconnection gateway device, the second set of network connection information from the one or more external NFV entities via a second interconnection gateway device located within the second network. In some instances, the method might further comprise sending, with the interconnection gateway device and to at least one of the one or more external NFV entities via the second interconnection gateway device, a service catalog indicating at least one of a plurality of VNFs, a plurality of application programming interfaces ("APIs"), or a plurality of services offered by the one or more internal NFV entities.

According to some embodiments, the first set of abstracted network connection information might include fine-grained information that is hidden from the one or more external NFV entities, while the second set of abstracted network connection information might include coarse-grained information that is public information. In some embodiments, the method might further comprise certifying, with the interconnection gateway device, the one or more VNFs, and storing, with the interconnection gateway device, a record of the one or more VNFs that are certified in a database in communication with the interconnection gateway device.

In another aspect, a system might comprise an interconnection gateway device located within a first network, one or more internal network functions virtualization ("NFV") entities located within the first network, and one or more external NFV entities located within a second network that is external to the first network. The interconnection gateway device might comprise at least one first processor, at least one first data storage device in communication with the at least one first processor (the at least one first data storage device having data stored thereon), and at least one first non-transitory computer readable medium in communication with the at least one first processor and with the at least one first data storage device. The at least one first non-transitory computer readable medium might have stored thereon computer software comprising a first set of instructions that, when executed by the at least one first processor, causes the interconnection gateway device to perform one or more functions. Each of the one or more internal NFV entities might comprise at least one second processor, at least one second data storage device in communication with the at least one second processor (the at least one second data storage device having data stored thereon), at least one second non-transitory computer readable medium in communication with the at least one second processor and with the at least one second data storage device. The at least one second non-transitory computer readable medium might have stored thereon computer software comprising a second set of instructions that, when executed by the at least one second processor, causes the internal NFV entity to perform one or more functions. Each of the one or more external NFV entities might comprise at least one third processor, at least one third data storage device in communication with the at least one third processor (the at least one third data storage device having data stored thereon), at least one third non-transitory computer readable medium in communication with the at least one third processor and with the at least one third data storage device, the at least one third non-transitory computer readable medium having stored thereon computer software comprising a third set of instructions that, when executed by the at least one third processor, causes the external NFV entity to perform one or more functions.

The second set of instructions might comprise instructions for sending a first set of network connection information to the interconnection gateway device, while the third set of instructions might comprise instructions for sending a second set of network connection information to the interconnection gateway device. The first set of instructions might comprise instructions for receiving, from the one or more internal NFV entities, the first set of network connection information, instructions for receiving, from the one or more external NFV entities, the second set of network connection information, instructions for abstracting the first set of network connection information to generate a first set of abstracted network connection information, and instructions for abstracting the second set of network connection information to generate a second set of abstracted network connection information. Each of the first set of abstracted network connection information and the second set of abstracted network connection information might be abstracted to be independent of any particular NFV entity in any network. The first set of instructions might further comprise instructions for establishing one or more links between each of the one or more internal NFV entities and each corresponding one of the one or more external NFV entities, based at least in part on one or more of the first set of abstracted network connection information or the second set of abstracted network connection information, and instructions for providing access to one or more virtualized network functions ("VNFs") via the one or more links. The second set of instructions might further comprise instructions for accessing, sending, or receiving the one or more VNFs via the one or more links, while the third set of instructions might further comprise instructions for accessing, receiving, or sending the one or more VNFs via the one or more links.

In some cases, the first network might be associated with a first service provider, while the second network might be associated with a second service provider separate from the first service provider. In some embodiments, each of the one or more internal NFV entities might comprise at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like. Each of the one or more external NFV entities might comprise at least one of a NFV orchestrator, a NFVI system, a NFV MANO system, a VNF manager, a NFV resource manager, a VIM, a VM, a macro orchestrator, or a domain orchestrator, and/or the like, and each of the one or more third NFV entities might comprise at least one of a NFV orchestrator, a NFVI system, a NFV MANO system, a VNF manager, a NFV resource manager, a VIM, a VM, a macro orchestrator, or a domain orchestrator, and/or the like.

According to some embodiments, the interconnection gateway device might comprise a physical gateway device, a gateway application hosted on a distributed computing platform, a gateway application hosted on a cloud computing platform, a VNF-based gateway application hosted on a centralized gateway hardware system, a gateway application hosted on a server, a VNF-based gateway application hosted on a computing device, or an external network-to-network interface ("E-NNI") device, and/or the like.

Merely by way of example, in some embodiments, the first set of instructions might further comprise instructions for bursting at least one VNF of the one or more VNFs from a first pod to a second pod, based at least in part on one or more of time of day, geographic information, expected usage throughout a day, expected changes in usage throughout a day, one or more performance characteristics, or changes in one or more performance characteristics. Each of the first pod and the second pod might comprise physical hardware resources that are part of one of an internal NFV entity of the one or more internal NFV entities or an external NFV entity of the one or more external NFV entities.

In some embodiments, the first set of instructions might further comprise instructions for service chaining two or more VNFs together to provide a single network service. According some embodiments, the first set of instructions might further comprise instructions for sending, to at least one of the one or more external NFV entities, a service catalog indicating at least one of a plurality of VNFs, a plurality of application programming interfaces ("APIs"), or a plurality of services offered by the one or more internal NFV entities. In various embodiments, the first set of instructions might further comprise instructions for certifying the one or more VNFs and instructions for storing a record of the one or more VNFs that are certified in a database in communication with the interconnection gateway device.

In yet another aspect, an interconnection gateway device might comprise at least one processor, at least one data storage device in communication with the at least one processor (the at least one data storage device having data stored thereon), and at least one non-transitory computer readable medium in communication with the at least one processor and the at least one data storage device. The at least one non-transitory computer readable medium might have stored thereon computer software comprising a set of instructions that, when executed by the at least one processor, causes the interconnection gateway device to perform one or more functions. The set of instructions might comprise instructions for receiving, from one or more internal network functions virtualization ("NFV") entities, a first set of network connection information and instructions for receiving, from one or more external NFV entities, a second set of network connection information. Each of the one or more internal NFV entities might be located within the first network in which the interconnection gateway device is located, while each of the one or more external NFV entities might be located within a second network external to the first network.

The set of instructions might also comprise instructions for abstracting the first set of network connection information to generate a first set of abstracted network connection information and instructions for abstracting the second set of network connection information to generate a second set of abstracted network connection information. Each of the first set of abstracted network connection information and the second set of abstracted network connection information might be abstracted to be independent of any particular NFV entity in any network. The set of instructions might further comprise instructions for establishing one or more links between each of the one or more internal NFV entities and each corresponding one of the one or more external NFV entities, based at least in part on one or more of the first set of abstracted network connection information or the second set of abstracted network connection information. The set of instructions might additionally comprise instructions for providing access to one or more virtualized network functions ("VNFs") via the one or more links.

According to some embodiments, each of the one or more internal NFV entities might comprise at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like.

In some cases, the set of instructions might further comprise instructions for bursting at least one VNF of the one or more VNFs from a first pod to a second pod, based at least in part on one or more of time of day, geographic information, expected usage throughout a day, expected changes in usage throughout a day, one or more performance characteristics, or changes in one or more performance characteristics, and/or the like. Each of the first pod and the second pod might comprise physical hardware resources that are part of one of an internal NFV entity of the one or more internal NFV entities or an external NFV entity of the one or more external NFV entities.

In some instances, the set of instructions might further comprise instructions for service chaining two or more VNFs together to provide a single network service. In some embodiments, the set of instructions might further comprise instructions for sending, to at least one of the one or more external NFV entities, a service catalog indicating at least one of a plurality of VNFs, a plurality of application programming interfaces ("APIs"), or a plurality of services offered by the one or more internal NFV entities.

Merely by way of example, in some cases, the set of instructions might further comprise instructions for certifying the one or more VNFs and instructions for storing a record of the one or more VNFs that are certified in a database in communication with the interconnection gateway device.

Various modifications and additions can be made to the embodiments discussed without departing from the scope of the invention. For example, while the embodiments described above refer to particular features, the scope of this invention also includes embodiments having different combination of features and embodiments that do not include all of the above described features.

In some aspects, a NFVIG might sit on each side of two service provider networks associated with two service providers that would like to have a NFV interconnection (for reasons including, but not limited to, customer roaming services, customer nomadic services, wholesale play, disaster recovery, offloading, service bureau operations, or network operator/service provider cooperation, and/or the like). Such a NFVIG might in effect be a super-gateway or a gateway complex with sub-gateways as part of it that might handle appropriate sub-interconnections, including, without limitation, OSS/BSS, VNF, NFVI, orchestrator, VNF managers, virtualized infrastructure manager, and/or the like. Some key functions of the NFVIG might include, but are not limited to, providing key gateway functions, including, without limitation, security, quality of service ("QoS"), information hiding, billing information collection, fault isolation/zoning, and/or the like. The interconnections might take the form of APIs, other interconnection protocols (preferably defined as industry standard(s)), and/or the like. Once NFV is widely deployed, some scenarios for utilizing or implementing (widely deployed) NFVIG might include, but are not limited to, overload/offload, third party contract implementation, regulatory/unbundling mandates, multi-service provider collaborations, company merger transitions, and/or the like.

In various aspects, the NFVIG (or similar functionality) might be used in a hub or centralized service bureau (or clearing house) mode in which many network operators can interconnect with many network operators—versus the NFVIG, which (as described herein) is a one-to-one network operator interconnection model. The NFVIH might provide many-to-many operator interconnections at the NFVIH or might provide indirect interconnection by simply providing the availability and/or routing information for on-demand (or scheduled) operator-to-operator interconnection outside of the NFVIH (in effect facilitated by the NFVIH). Once NFVIGs (or NFV interconnection via other methods) become widely adopted, scalability and ancillary service (including, without limitation, billing, availability, routing, etc.) will be needed for wide interconnection. The NFVIH or similar functionalities (as described herein) provide solutions for this.

For network management and control, e.g., for large scale applications involved with implementing NFV interconnection gateway and/or hub functionalities, the following techniques and/or technologies, among other similar techniques and/or technologies, can facilitate NFV interconnection and/or VNF access provision: Software Defined Networking ("SDN"); Deep Packet Inspection ("DPI"); Network Functions Virtualization ("NFV") with Management and Orchestration; Service Chaining/Forwarding Graphs; and/or the like.

Herein, a "hypervisor" might refer to a virtual machine manager ("VMM"), which might be a component of computer software, firmware, and/or hardware that creates and runs virtual machines. The "hypervisor" might run one or more VMs on a computer defined as a "host machine," and each of the one or more VMs might be defined as a "guest machine." In operation, the "hypervisor" might provide the "guest machines" or operating systems of the "guest machines" with a virtual operating platform, and might manage the execution of the "guest machine" operating systems.

In some embodiments, rather than (or in addition to) a VM system, containers may be utilized for virtualization functionalities. A "container" might refer to a virtual construct that is similar to a virtual machine, except that, in some embodiments, containers (within a host computing system) share the same operating system, and thus do not need to run multiple instances of the operating system (as in the case of VMs in a host computing system). Accordingly, containers may be smaller in size and may be more efficient to run compared with VMs or hypervisors.

The term "business support system" ("BSS") might refer to components that a service provider (such as a telephone operator or telecommunications company) might use to run its business operations, including, for example, taking orders, handling payment issues, or dealing with revenues, and the like. BSS might generally cover the four main areas of product management, customer management, revenue management, and order management. In a related manner, the term "operations support system" ("OSS") might refer to components used by telecommunications service providers to deal with the telecommunications network itself, supporting processes including, but not limited to, maintaining network inventory, provisioning services, configuring network components, managing faults, and the like. The two systems functioning together might be referred to as "BSS/OSS."

An "application programming interface" ("API") might refer to a protocol intended to be used as an interface by software components to communicate with each other.

"Virtualization" might refer to a process of mapping hardware resources to create "virtual machine resource" within the framework of the VMs so that the VM environment may utilize the hardware resources. For example, each of the north, south, east, and west interfaces are parts of physical and/or virtual links that have been apportioned or "virtualized" to an application as a port to the application, which might be associated with various external components (i.e., BSS/OSS, AIN, second autonomous systems, customers, and the like) via the hardware or host system on which the VM is running. A virtualization congestion control frameworks might be as described in detail in U.S. patent application Ser. No. 14/531,000 (the "'000 application"), filed Nov. 3, 2014 by Michael K. Bugenhagen, entitled, "Physical to Virtual Network Transport Function Abstraction" and U.S. patent application Ser. No. 14/061,147 (the "'147 application"), filed Oct. 23, 2013 by Michael K. Bugenhagen, entitled, "Virtualization Congestion Control Framework," which is a continuation-in-part application of U.S. patent application Ser. No. 14/060,450 (the "'450 application"), filed Oct. 22, 2013 by Michael K. Bugenhagen, entitled, "Virtualization Congestion Control Framework," the entire disclosures of which are incorporated herein by reference in their entirety for all purposes. One or more infrastructure components of these virtualization congestion control frameworks may, in some non-limiting embodiment, be utilized in implementing physical to virtual network transport function abstraction, as discussed in the '000 application.

Specific Exemplary Embodiments

Figure 10:
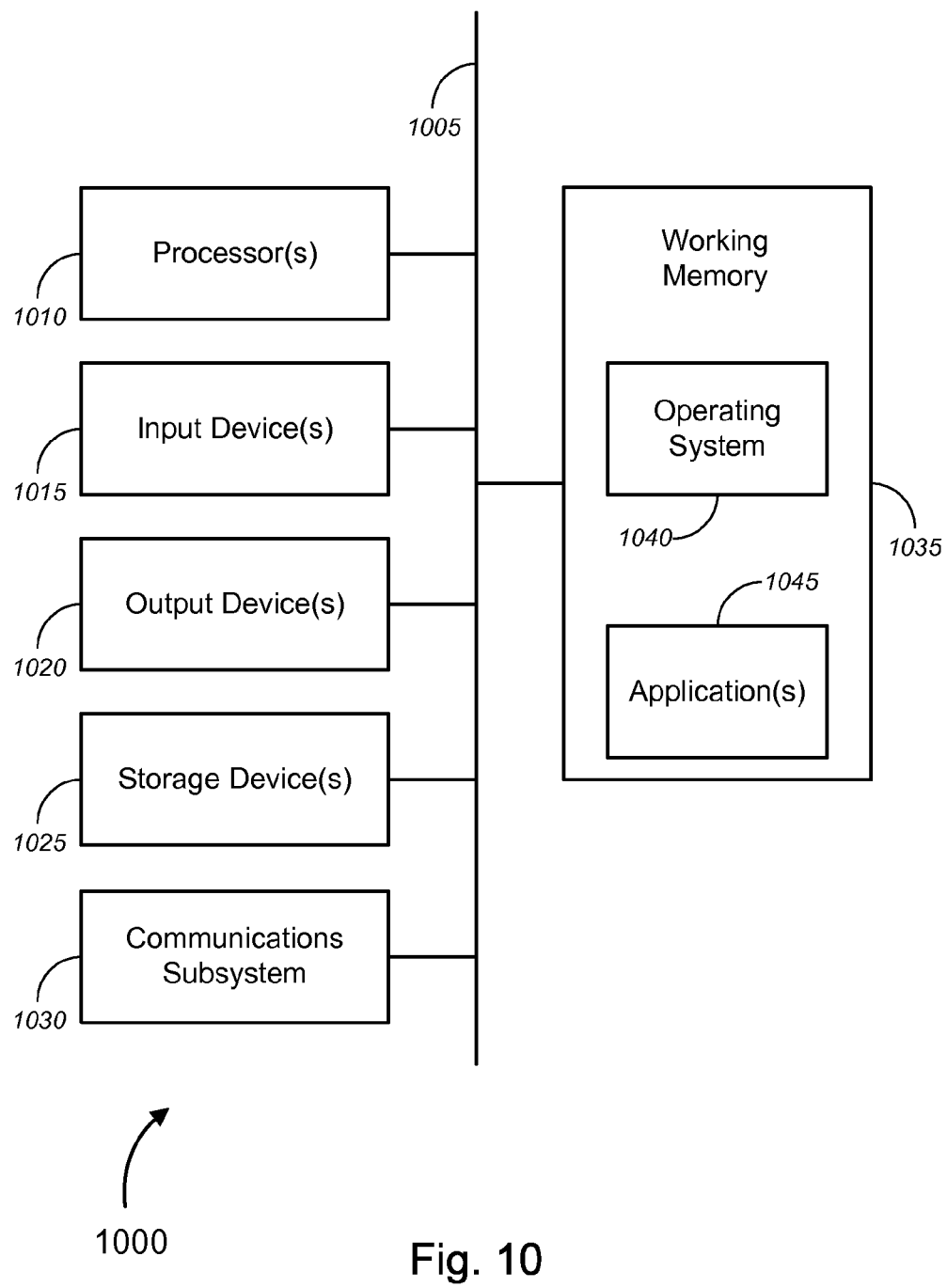
FIG. 10 is a block diagram illustrating an exemplary computer or system hardware architecture, in accordance with various embodiments.
Figure 11:
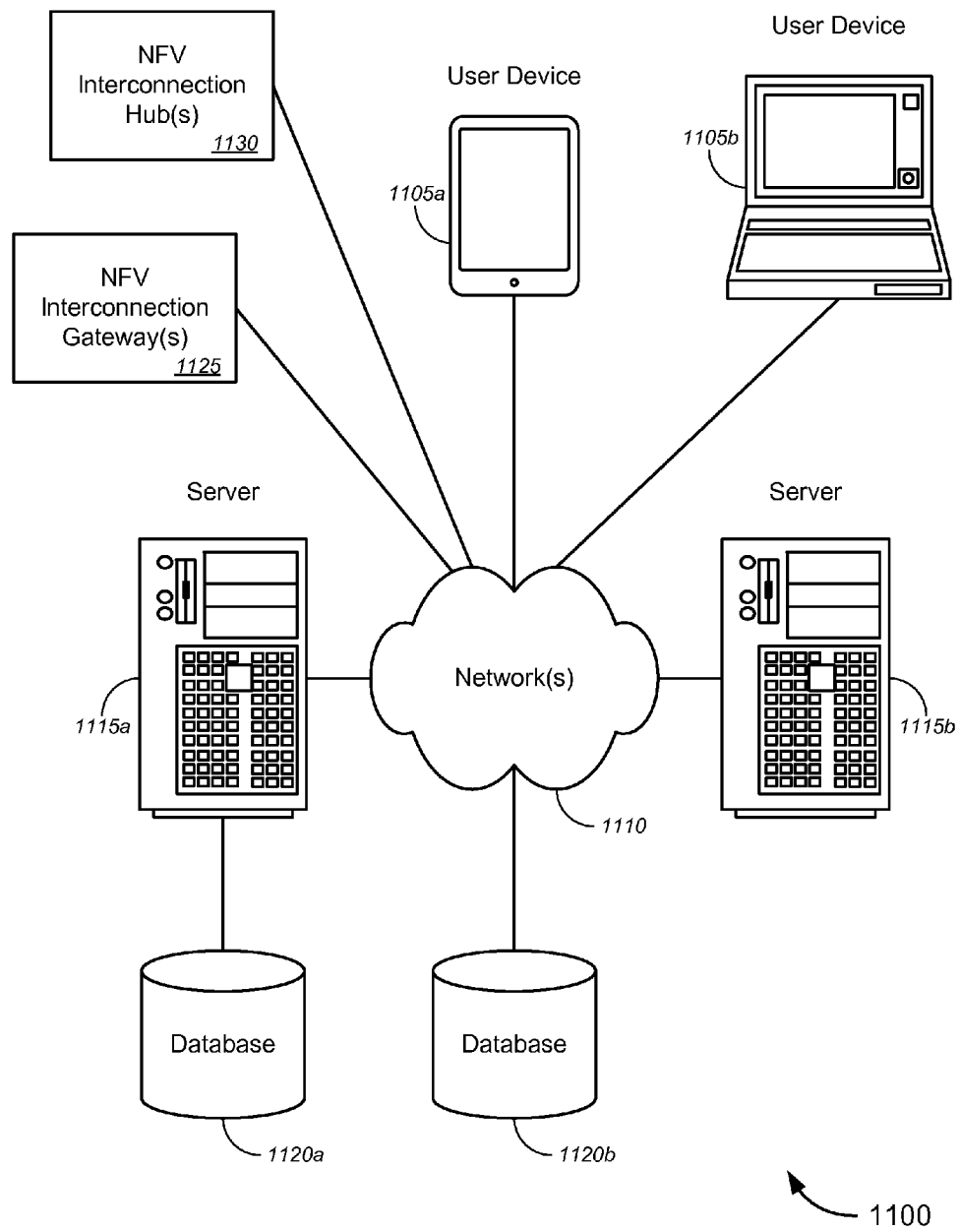
FIG. 11 is a block diagram illustrating a networked system of computers, computing systems, or system hardware architecture, which can be used in accordance with various embodiments.

We now turn to the embodiments as illustrated by the drawings. FIGS. 1-11 illustrate some of the features of the method, system, and apparatus for implementing interconnection gateway and/or hub functionalities between or among two or more network functions virtualization ("NFV") entities that are located in different networks, as referred to above. FIGS. 1-4 illustrate some of the features of the method, system, and apparatus for implementing interconnection gateway functionality between a first set of NFV entities in a first network and a second set of NFV entities in a second network, while FIGS. 5-9 illustrate some of the features of the method, system, and apparatus for implementing interconnection hub functionality among a first set of NFV entities in a first network, a second set of NFV entities in a second network, through an $N^{th}$ set of NFV entities in an $N^{th}$ network or for implementing hub-to-hub interconnection among a first interconnection hub in a first external network, a second interconnection hub in a second external network, through an $N^{th}$ interconnection hub in an $N^{th}$ external network, and FIGS. 10 and 11 illustrate exemplary system and hardware implementation. The methods, systems, and apparatuses illustrated by FIGS. 1-11 refer to examples of different embodiments that include various components and steps, which can be considered alternatives or which can be used in conjunction with one another in the various embodiments. The description of the illustrated methods, systems, and apparatuses shown in FIGS. 1-11 is provided for purposes of illustration and should not be considered to limit the scope of the different embodiments.

NFV Interconnection Gateway Implementation

Figure 1B:
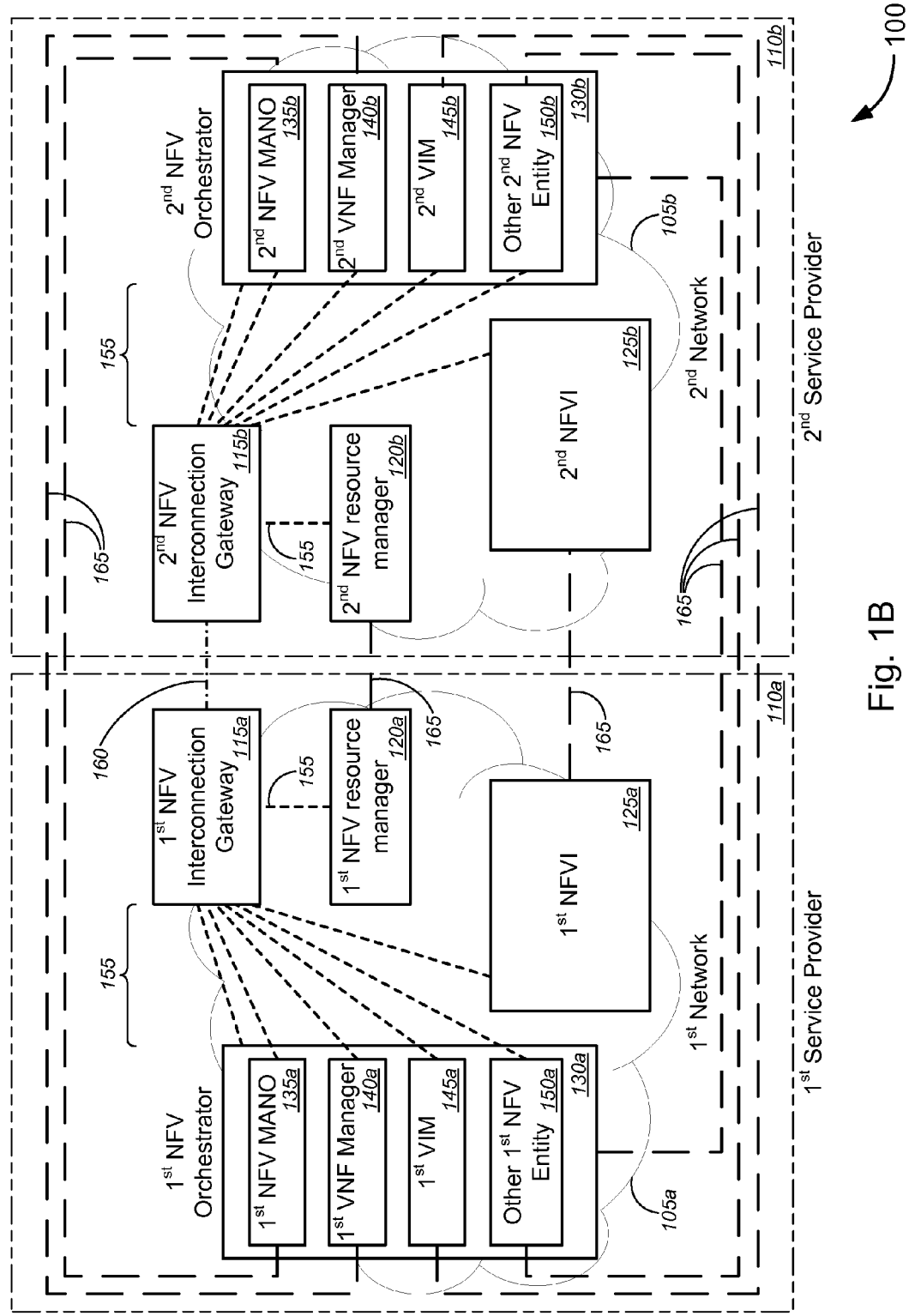

With reference to the figures, FIGS. 1A and 1B (collectively, "FIG. 1") are schematic diagrams illustrating various systems for implementing interconnection gateway functionality between a first set of network functions virtualization ("NFV") entities in a first network and a second set of NFV entities in a second network, in accordance with various embodiments.

In the embodiment of FIG. 1A, system 100 might comprise a first network 105a and a second network 105b, which are respectively associated with a first service provider 110a and a second service provider 110b. System 100 might further comprise a NFV interconnection gateway or an interconnection gateway device 115 and one or more first NFV entities, both of which are located within the first network 105a. The one or more first NFV entities, according to some embodiments, might include, without limitation, one or more of a NFV resource manager 120, a first NFV Infrastructure ("NFVI") system 125a, a NFV orchestrator 130, a NFV management and orchestration ("MANO") architectural framework or system 135, a virtual network function ("VNF") manager 140, a virtual infrastructure manager ("VIM") 145, and/or other first NFV entities 150a. In some instances, the NFV MANO system 135, the VNF manager 140, the VIM 145, and/or the other first NFV entities 150a might be part of the NFV orchestrator 130. In alternative instances, one or more of the NFV MANO system 135, the VNF manager 140, the VIM 145, and/or the other first NFV entities 150a might be separate from, but in communication with, the NFV orchestrator 130. In some cases, the other first NFV entities 150a might include, but are not limited to, a virtual machine ("VM"), a macro orchestrator, a domain orchestrator, a god orchestrator, and/ or the like.

System 100 might further comprise one or more second NFV entities located within the second network 105b. The one or more second NFV entities might include a second NFVI system 125b and one or more other second NFV entities 150b, which might include, without limitation, one or more of a VM, a macro orchestrator, a domain orchestrator, a god orchestrator, and/or the like. In some embodiments, the NFV interconnection gateway 115 might be an application running on a cloud platform, while in some cases might be part of any NFV entity that needs to interconnect with another NFV platform (e.g., MANO system, NFVI, VNF, etc.). In some instances, the interconnection gateway 115 might have both a physical component and a virtual component. The physical component might primarily be the physical interface between two or more networks of different service providers, while the virtual component might be an NFV entity that is hosted within the service provider's network. In some cases, it may be possible that each participating service provider could have an NFV hosted in its respective network, but that is not required. According to some embodiments, an NFV entity might be split into a portion completely under the control of an owning service provider. The owning service provider can then establish a set of functions that are available to other service providers via application programming interfaces ("APIs") to tailor their specific needs at the interconnection gateway. The owning service provider might ensure that the function(s) provided and the APIs provided enable functionality to other service providers, while also protecting the owning service provider network from nefarious activities. In general, the NFV interconnection gateway, which could be centralized or distributed within one network, might provide one-to-one NFV interconnection between two service provider networks.

In operation, the NFV interconnection gateway 115 might receive a first set of network connection information from at least one of the one or more first NFV entities 120-150a via links 155 (which are represented in FIG. 1 as dash lines).

The NFV interconnection gateway 115 might also receive a second set of network connection information from at least one of the one or more second NFV entities 125b and the other second NFV entities 150b via links 160 (which are represented in FIG. 1 as dot-dash lines) that extend between the first network 105a and the second network 105b. The NFV interconnection gateway 115 might abstract the first set of network connection information and the second set of network connection information to generate a first set of abstracted network connection information and a second set of abstracted network connection information, respectively. The NFV interconnection gateway 115 might establish one or more links 165 between each of the one or more first NFV entities and each corresponding one of the one or more second NFV entities (in this case between the first and second NFVI systems 125a and 125b, and between the other first NFV entity 150a and the other second NFV entity 150b), based at least in part on one or more of the first set of abstracted network connection information or the second set of abstracted network connection information.

The NFV interconnection gateway 115 might subsequently provide access to one or more VNFs via the one or more links 165 (which are represented in FIG. 1 as long dash lines) that extend between the first network 105a and the second network 105b. In general, access can be either local access (e.g., a copy of the VNF is transferred to the NFV entity of the second network and is run on resources in the second network) or remote access (e.g., the VNF is run on the owning service provider's network resources (in this example, the first network) and the second NFV entity is provided with access to the VNF running on the owning service provider's network resources). In some cases, providing access to the one or more VNFs might include, without limitation, one or more of providing at least one second NFV entity of the one or more second NFV entities 125b and 150b with access to one or more VNFs running on at least one first NFV entity of the one or more first NFV entities 120-150a or providing at least one first NFV entity of the one or more first NFV entities 120-150a with access to one or more VNFs running on at least one second NFV entity of the one or more second NFV entities 125b and 150b, without sending the one or more VNFs from one to the other of the first or second NFV entities; sending one or more VNFs from at least one second NFV entity of the one or more second NFV entities 125b and 150b to at least one first NFV entity of the one or more first NFV entities 120-150a, or vice versa; providing access, via the interconnection gateway device 115, to the one or more VNFs; providing access to one or more VNFs, via peering connection between each of the one or more first NFV entities and each corresponding one of the one or more second NFV entities (in this case between the first and second NFVI systems 125a and 125b, and/or between the other first NFV entity 150a and the other second NFV entity 150b, or the like); bursting, using an application programming interface ("API"), one or more VNFs from at least one first NFV entity to at least one second NFV entity, or vice versa; and/or the like.

Merely by way of example, in some embodiments, each of one or more second NFV entities might be without the capacity and/or capability to locally execute the one or more VNFs, and might comprise a device that is configured to request execution of VNFs and to access the VNFs being executed on corresponding one of the one or more first NFV entities.

In alternative embodiments, as shown in the embodiment of FIG. 1B, both the first network 105a and the second network 105b might include NFV interconnection gateway devices 115a and 115b (collectively, "interconnection gateway devices 115"). In such embodiments, system 100 might further comprise the second NFV interconnection gateway or interconnection gateway device 115b located in the second network 105b, as well as one or more second NFV entities, which are located in the second network 105b. In some embodiments, each of the NFV interconnection gateway devices 115 might include, without limitation, one or more of a physical gateway device, a gateway application hosted on a distributed computing platform, a gateway application hosted on a cloud computing platform, a VNF-based gateway application hosted on a centralized gateway hardware system, a gateway application hosted on a server, a VNF-based gateway application hosted on a computing device, an external network-to-network interface ("E-NNI") device, and/or the like.

The NFV interconnection gateway device 115, the NFV resource manager 120, the NFV orchestrator 130, the NFV MANO system 135, the VNF manager 140, and the VIM 145 of FIG. 1A might be referred to in FIG. 1B as the first interconnection gateway device 115a, the first NFV resource manager 120a, the first NFV orchestrator 130a, the first NFV MANO system 135a, the first VNF manager 140a, and the first VIM 145a.

The one or more second NFV entities might include, but are not limited to, one or more of a second NFV resource manager 120b, the second NFVI system 125b, a second NFV orchestrator 130b, a second NFV MANO system 135b, a second VNF manager 140b, a second VIM 145b, and/or the other second NFV entities 150b. In some instances, the second NFV MANO system 135b, the second VNF manager 140b, the second VIM 145b, and/or the other second NFV entities 150b might be part of the second NFV orchestrator 130b. In alternative instances, one or more of the second NFV MANO system 135b, the second VNF manager 140b, the second VIM 145b, and/or the other second NFV entities 150b might be separate from, but in communication with, the second NFV orchestrator 130b.

In operation, the embodiment of FIG. 1B might be similar to the embodiment of FIG. 1A, except that each interconnection gateway device 115 receives network connection information from local NFV entities (i.e., NFV entities located in the same network as the particular interconnection gateway device) over links 155. If the first NFV interconnection gateway 115a is performing interconnection gateway functionalities, it might request and might receive the second set of network connection information from the one or more second NFV entities via the second NFV interconnection gateway 115b, which might, in some cases, abstract the second set of network connection information from each of the one or more second NFV entities prior to sending the network connection information, and might send the second set of abstracted network connection information to the first NFV interconnection gateway 115a via links 160. In alternative cases, the second NFV interconnection gateway 115b might send the second set of network connection information to the first NFV interconnection gateway 115a via links 160, without abstracting the second set of network connection information. Based at least in part on one or more of the first set of abstracted network connection information or the second set of abstracted network connection information, the first NFV interconnection gateway 115a might establish the one or more links 165 (i.e., between the first and second NFV resource managers 120, between the first and second NFVI systems 125, between the first and second NFV orchestrators 130, between the first and second NFV MANO systems 135, between the first and second VNF managers 140, between the first and second VIMs 145, and between the other first and second NFV entities 150, and/or the like). The first NFV interconnection gateway device 115a might provide access to one or more VNFs in a manner similar to that as described above with respect to FIG. 1A. Although the above embodiment has been described with respect to the first NFV interconnection gateway device 115a performing the interconnection gateway functionalities, the various embodiments are not so limited and the second NFV interconnection gateway device 115b might perform the interconnection gateway functionalities. In alternative embodiments, each NFV interconnection gateway device 115a and 115b might each perform some of the interconnection gateway functionalities, as appropriate.

Figure 2:
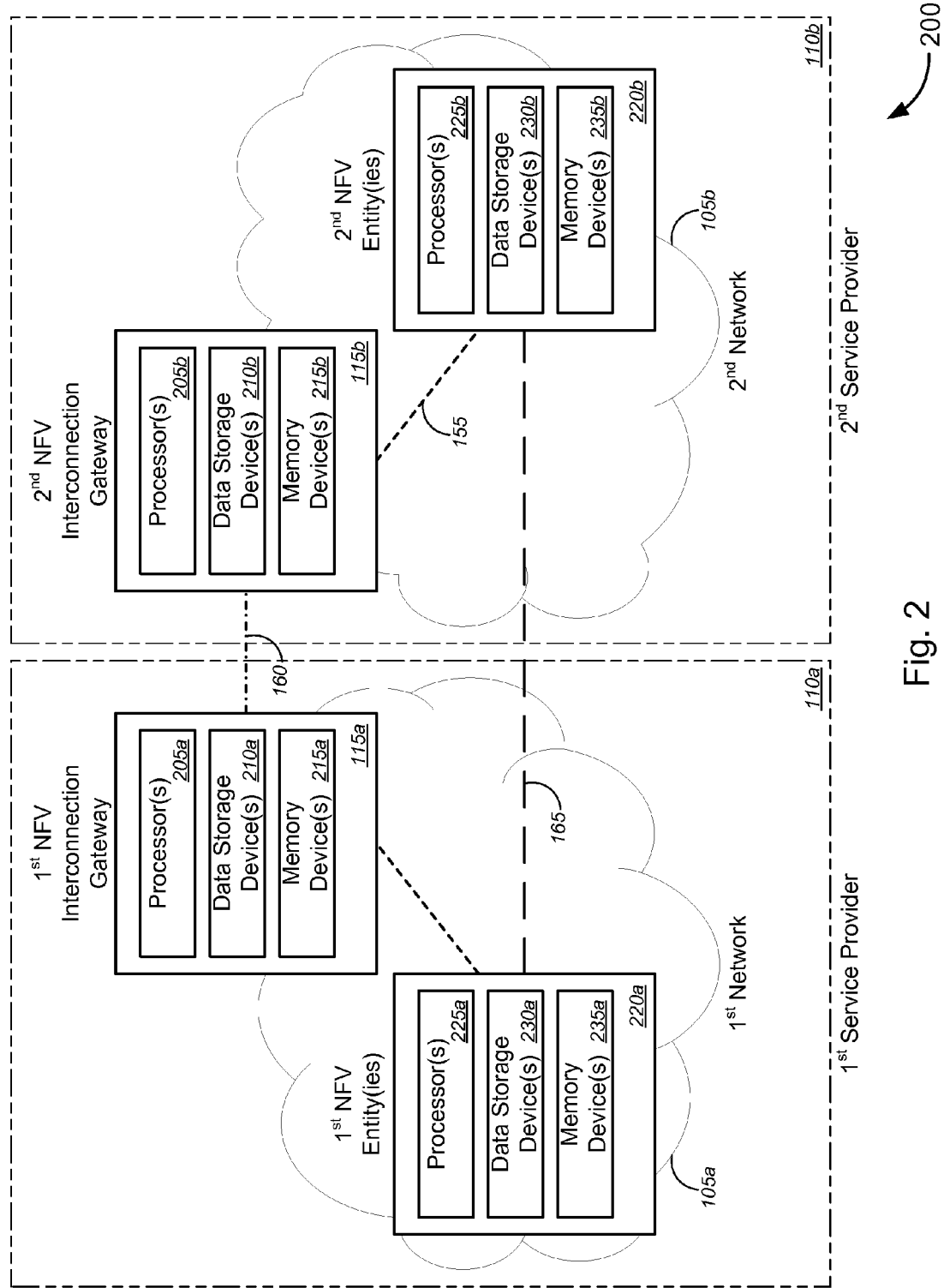
FIG. 2 is a block diagram illustrating another system for implementing interconnection gateway functionality between a first set of NFV entities in a first network and a second set of NFV entities in a second network, in accordance with various embodiments.

FIG. 2 is a block diagram illustrating another system for implementing interconnection gateway functionality between a first set of NFV entities in a first network and a second set of NFV entities in a second network, in accordance with various embodiments. FIG. 2 is similar to the embodiment of FIG. 1B, except that FIG. 2 depicts processors, data storage devices, and memory devices within each of the NFV interconnection gateway devices 115 and in each of the NFV entities 220. In particular, as shown in FIG. 2, the first NFV interconnection gateway device 115a might include, without limitation, a processor(s) 205a, a data storage device(s) 210a, and a memory device(s) 215a that are all interconnected with each other. Likewise, the second NFV interconnection gateway device 115b might include, without limitation, a processor(s) 205b, a data storage device(s) 210b, and a memory device(s) 215b that are all interconnected with each other. The data storage device(s) 210 might store data that is transmitted or received from the NFV interconnection gateway 115a or 115b, while the memory device(s) 215 might be a non-transitory computer readable medium that stores computer software comprising a set of instructions that, when executed by the corresponding processor(s) 205, causes the corresponding interconnection gateway device 115 to perform one or more functions (such as those as described herein with respect to FIGS. 1A, 1B, and 4A-4C, or the like).

In a similar manner, each of the first NFV entity(ies) 220a might include, but is not limited to, a processor(s) 225a, a data storage device(s) 230a, and a memory device(s) 235a that are all interconnected with each other. Likewise, each of the second NFV entity(ies) 220b might include, but is not limited to, a processor(s) 225b, a data storage device(s) 230b, and a memory device(s) 235b that are all interconnected with each other. The data storage device(s) 230 might store data that is transmitted or received from the NFV entity 220a or 220b, while the memory device(s) 235 might be a non-transitory computer readable medium that stores computer software comprising a set of instructions that, when executed by the processor(s) 225, causes the NFV entity 220 to perform one or more functions (such as those as described below with respect to FIGS. 1A, 1B, and 4A-4C, or the like).

The techniques and configurations of FIG. 2 are otherwise similar, if not identical to, the techniques and configurations as described above with respect to FIG. 1, and the descriptions of the embodiment of FIG. 1 may similarly be applicable to those of the embodiment of FIG. 2 (unless incompatible, inconsistent, or otherwise stated as being different).

Figure 3:
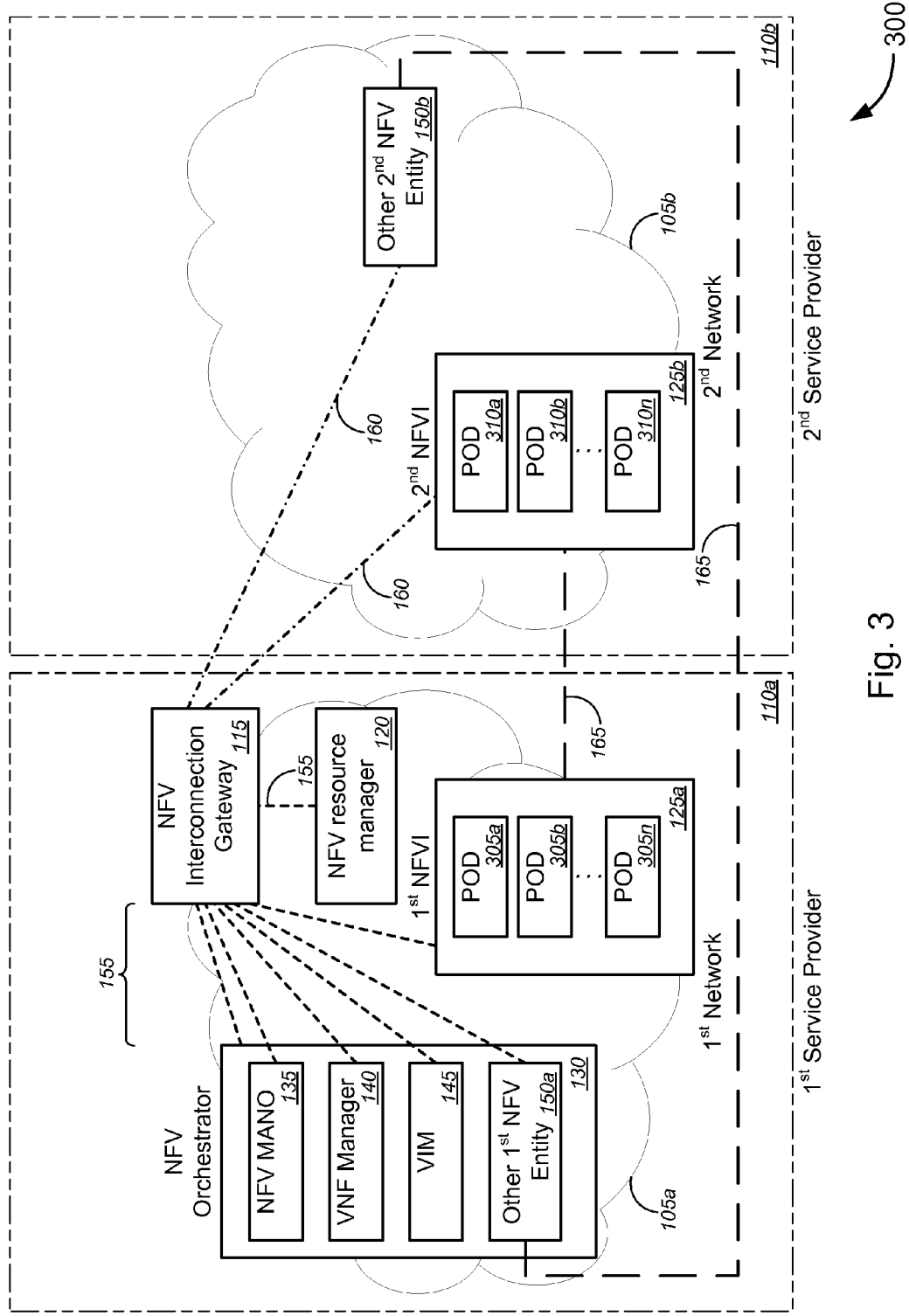
FIG. 3 is a schematic diagram illustrating yet another system for implementing interconnection gateway functionality between a first set of NFV entities in a first network and a second set of NFV entities in a second network, in accordance with various embodiments.

FIG. 3 is a schematic diagram illustrating yet another system for implementing interconnection gateway functionality between a first set of NFV entities in a first network and a second set of NFV entities in a second network, in accordance with various embodiments. FIG. 3 is similar to the embodiment of FIG. 1A, except that FIG. 3 depicts a plurality of pods in each of the first and second NFVI systems 125. In some embodiments, each pod might represent and/or include physical hardware resources that are part of the first or second NFVI system 125a or 125b or that are part of an external NFV entity (i.e., an NFV entity that is external to the first NFV entities or external to the second NFV entities, or that is external to the first and second networks 105a and 105b). In some cases, each pod might represent a rack of network communications equipment (e.g., compute resource, storage resource, etc.) within a telecommunications facility (e.g., DSLAM, CO, POP, Tera-POP, etc.) associated with one of the service providers 110.

Turning back to the embodiment of FIG. 3, the first NFVI system 125a might include a first pod 305a, a second pod 305b, through an $N^{th}$ pod 305n (collectively, "pods 305"), while the second NFVI system 125b might include a first pod 310a, a second pod 310b, through an $N^{th}$ pod 310n (collectively, "pods 310").

In operation, the NFV interconnection gateway device 115 might burst at least one VNF from a first pod to a second pod, based at least in part on one or more of time of day, geographic usage throughout a day, one or more performance characteristics (including, without limitation, latency, jitter, bandwidth, compute resource usage, storage resource usage, memory resource usage, and/or the like), or changes in one or more performance characteristics, and/or the like. In some embodiments, the first and second pods might be within the first NFVI system 125a, to allow the first service provider 110a that is providing the interconnection gateway functionality to internally burst the at least one VNF among its own physical hardware resources. In alternative embodiments, the interconnection gateway device 115 might burst the at least one VNF from any of the pods 305a-305n and 310a-310n to any other of the pods 305a-305n and 310a-310n. Bursting to a pod in the second network 105b (i.e., pods 310a-310n) might allow for more localized execution of VNFs closer to a customer.

Although each of the first NFVI 125a and the second NFVI 125b is depicted as a single component in the network, this is merely to simplify illustration, but the various embodiments are not so limited, and each NFVI 125 may be embodied as any suitable number of NFVI systems within its respective network 105. In some embodiments, each of the NFVI systems 125 might include, without limitation, hardware resources located at a customer premises (e.g., hardware resources in network equipment at a residential customer premises; hardware resources in other wireless or wireline customer premises equipment ("CPE"); resources in a customer's mobile devices or other user devices; hardware resources in telecommunications closet(s) or room(s) at a multi-dwelling unit; hardware resources in telecommunications closet(s) or room(s) at a commercial customer premises; and/or the like), at a digital subscriber line access multiplexer ("DSLAM") (e.g., hardware resources in telecommunications or equipment rack(s) at the DSLAM; and/or the like), at a central office ("CO") (e.g., hardware resources in telecommunications rack(s) at the CO; and/or the like), at a point of presence ("POP") with the network, at a Tera-POP (i.e., a POP that is capable of terabit per second (i.e., at least 1 trillion bits per second) data transfer speeds), or the like.

In a non-limiting example, based on information regarding usage at different times of day, geographic usage throughout a day, one or more performance characteristics (including, without limitation, latency, jitter, bandwidth, compute resource usage, storage resource usage, memory resource usage, and/or the like), or changes in one or more performance characteristics, and/or the like, the interconnection gateway device 115 might burst VNFs associated with a user's business or work to pods within the user's work premises or at a DSLAM or CO that is local to the user's work premises, just before the user typically arrives at work (e.g., between about 6 a.m. and 8 a.m. on weekday mornings). During the user's typical lunch break, the interconnection gateway device 115 might burst VNFs associated with the user's media content (e.g., media content playback VNFs, etc.), news resources (e.g., news gathering VNFs, sports information gathering VNFs, etc.), and/or the like to pods within the user's work premises (if the user typically eats at work), to a DSLAM or CO that is local to the user's work premises (if the user typically eats at or near work), or the like. After the user's typical lunch hour, the interconnection gateway device 115 might burst VNFs associated with the user's media content, news resources, and/or the like to pods at the CO, POP, Tera-POP, or the like. When the user typical leaves work (e.g., for home; such as after 6 p.m.), the interconnection gateway device 115 might burst the VNFs associated with the user's media content, news resources, and/or the like to pods at the user's residential premises, at a DSLAM or CO near the user's residential premises, and/or the like, and might burst the VNFs associated with the user's business or work to pods at the CO, POP, Tera-POP, or the like. In the middle of the night (e.g., between 11 p.m. and 5 a.m.), the interconnection gateway device 115 might burst VNFs associated with backup software applications to pods that are closer to the user's work premises and/or to the user's residential premises, to back up the user's work and/or personal/entertainment data, or the like. Also in the middle of the night, the interconnection gateway device 115 might burst VNFs associated with third party computational cycles to pods closer to the user's work premises and/or the user's residential premises, to utilize unused or underutilized compute and/or data storage resources, or the like.

The techniques and configurations of FIG. 3 are otherwise similar, if not identical to, the techniques and configurations as described above with respect to FIG. 1, and the descriptions of the embodiment of FIG. 1 may similarly be applicable to those of the embodiment of FIG. 3 (unless incompatible, inconsistent, or otherwise stated as being different).

Figure 4A:
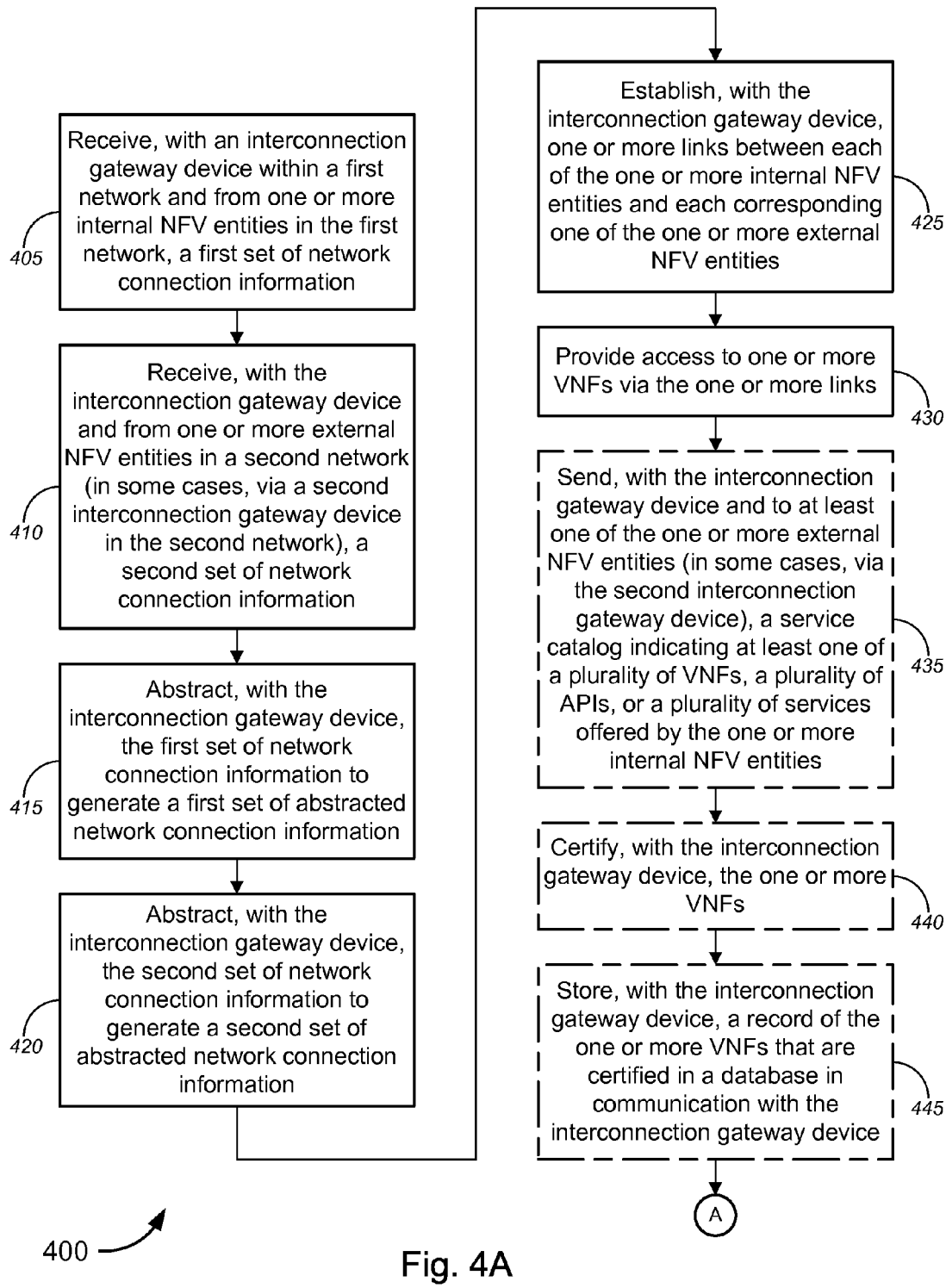
FIGS. 4A-4C represent a system flow diagram illustrating a method for implementing interconnection gateway functionality between a first set of NFV entities in a first network and a second set of NFV entities in a second network, in accordance with various embodiments.
Figure 4B:
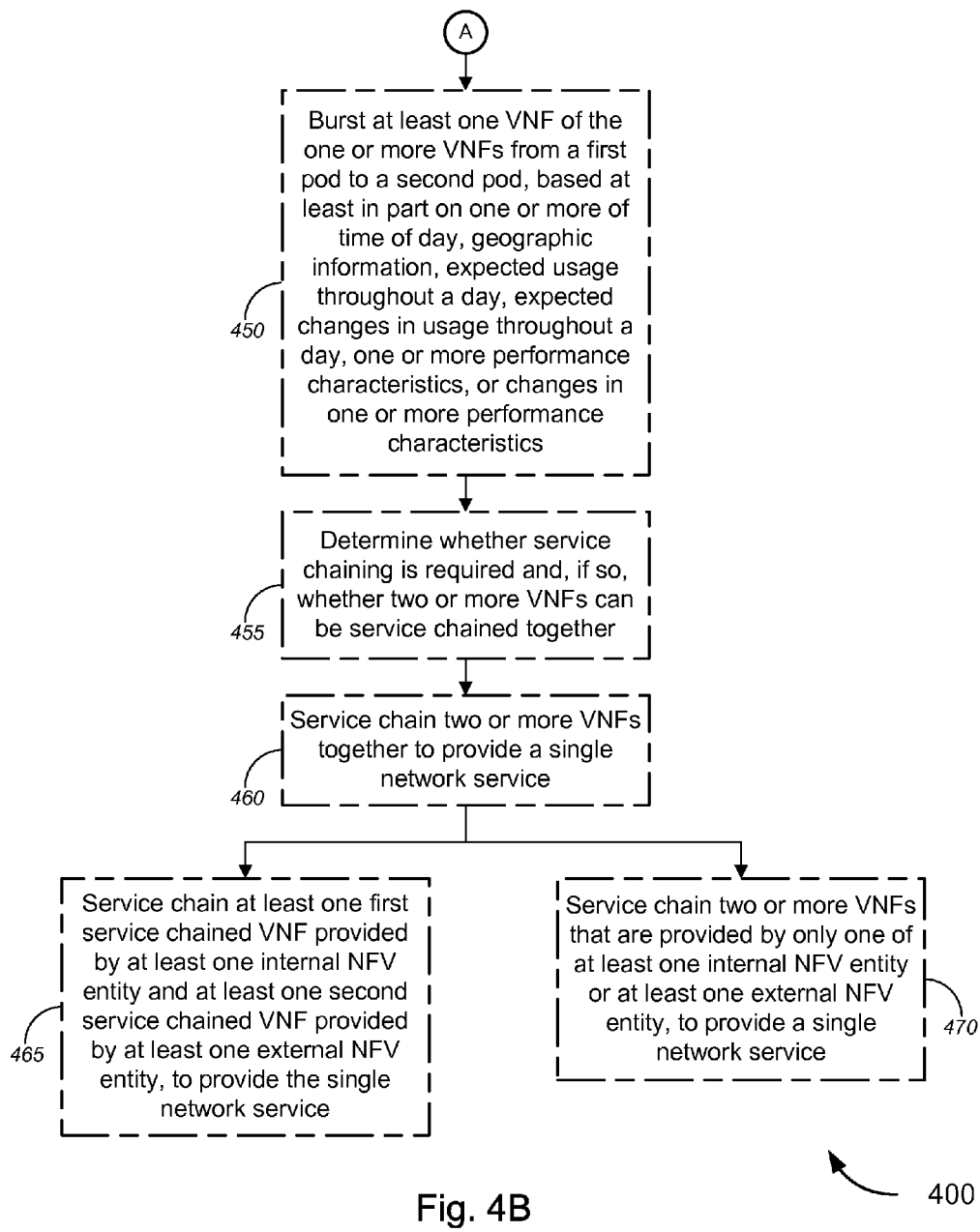
Figure 4C:
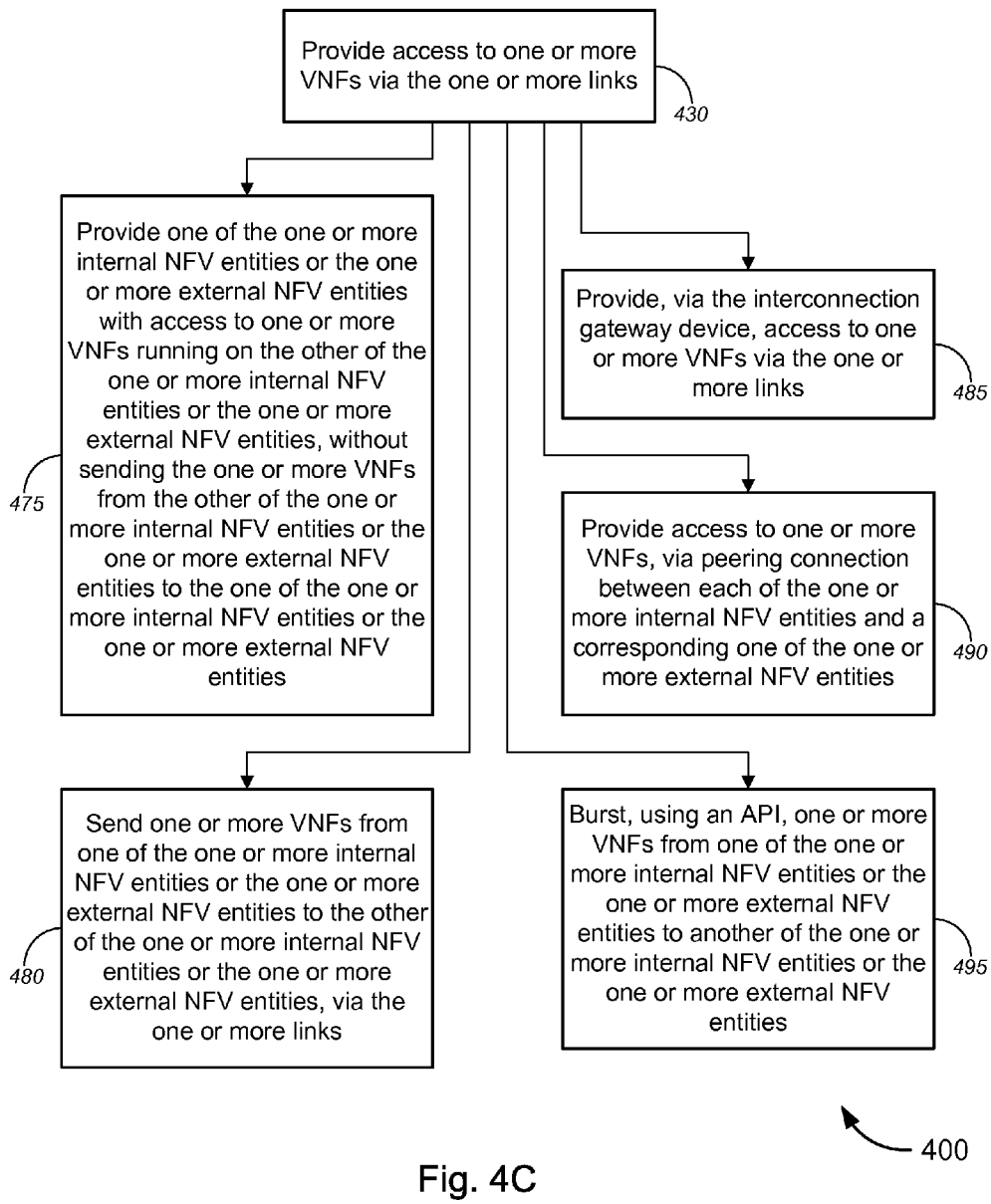

FIGS. 4A-4C (collectively, "FIG. 4") represent a system flow diagram illustrating a method for implementing interconnection gateway functionality between a first set of NFV entities in a first network and a second set of NFV entities in a second network, in accordance with various embodiments. The embodiments as represented in FIG. 4 are merely illustrative and are not intended to limit the scope of the various embodiments. With reference to FIG. 4, method 400 in FIG. 4A continues onto FIG. 4B, linked by circular markers denoted by "A." FIG. 4C illustrates alternative embodiments for providing access to one or more VNFs in block 430 of FIG. 4A.

While the techniques and procedures are depicted and/or described in a certain order for purposes of illustration, it should be appreciated that certain procedures may be reordered and/or omitted within the scope of various embodiments. Moreover, while the method illustrated by FIG. 4 can be implemented by or with (and, in some cases, are described below with respect to) the systems 100-300 of FIGS. 1-3, respectively (or components thereof), such methods may also be implemented using any suitable hardware implementation. Similarly, while each of the systems 100-300 (and/or components thereof) of FIGS. 1-3, respectively, can operate according to the method illustrated by FIG. 4 (e.g., by executing instructions embodied on a computer readable medium), the systems 100-300 can each also operate according to other modes of operation and/or perform other suitable procedures.

In the embodiment of FIG. 4, method 400, at block 405, might comprise receiving, with an interconnection gateway device within a first network and from one or more internal network functions virtualization ("NFV") entities, a first set of network connection information. Each of the one or more internal NFV entities might be located within the first network. At block 410, method 400 might comprise receiving, with the interconnection gateway device and from one or more external NFV entities in a second network (in some cases, via a second interconnection gateway device in the second network), a second set of network connection information. According to some embodiments, the first network might be associated with a first service provider, and the second network might be associated with a second service provider separate from the first service provider.

In some cases, the first set of network connection information and/or the second set of network connection information might each comprise information regarding at least one of latency, jitter, bandwidth, packet loss, nodal connectivity, compute resources, storage resources, memory capacity, routing, operations support systems ("OSS"), or business support systems ("BSS"), additional services (e.g., firewall, security, parental control functionality, etc.), and/or the like. In some instances, the first set of network connection information and/or the second set of network connection information might each, alternatively or additionally, comprise information regarding at least one of fault, configuration, accounting, performance, or security ("FCAPS"), which might include, without limitation, fault isolation/zoning/trouble ticketing, service ordering/information organization/information hiding, billing/accounting, QoS/other performance characteristics (jitter, latency, bandwidth, etc.)/performance in view of service level agreements ("SLAs")/reporting, or authentication/authorization/accounting ("AAA"), respectively.

In some embodiments, method 400 might further comprise abstracting, with the interconnection gateway device, the first set of network connection information to generate a first set of abstracted network connection information (block 415) and abstracting, with the interconnection gateway device, the second set of network connection information to generate a second set of abstracted network connection information (block 420). In some cases, each of the first set of abstracted network connection information and the second set of abstracted network connection information might be abstracted to be independent of any particular NFV entity in any network. In other words, the abstracted network connection information is abstracted so as to be readable or understandable by any computing system or network component, and is not information that is only readable or understandable (i.e., does not use proprietary information formats or the like) by particular kinds, by particular brands of NFV entities, by particular products made by a particular manufacturer, or by particular products operated or maintained by a particular service provider. In this manner, universal communication and/or interconnection may be achieved between different NFV entities (i.e., NFV entities manufactured, operated, and/or maintained by particular parties, or the like).

At block 425, method 400 might comprise establishing, with the interconnection gateway device, one or more links between each of the one or more internal NFV entities and each corresponding one of the one or more external NFV entities, in some cases, based at least in part on one or more of the first set of abstracted network connection information or the second set of abstracted network connection information. Method 400 might further comprise, at block 430, providing access to one or more virtualized network functions ("VNFs") via the one or more links, different embodiments of which are described below with respect to FIG. 4C.

In some cases, the one or more links might be established between the first service provider and the second service provider to establish interconnection for providing at least one of customer roaming services, customer nomadic services, wholesale play, disaster recovery, offloading, service bureau operations, and/or network operator/service provider cooperation. For example, for customer roaming services, user 1, who is a customer of the first service provider and who is resident in State A, might travel to State B for a vacation or for a business trip. It is assumed for this example that the first service provider does not offer the same range of services in State B, and that a second service provider (which is unaffiliated with the first service provider) operates in State B. User 1 might desire to have the same network functionalities for his or her user devices, which he or she is bringing to State B, as well as the same network functionalities for monitoring his or her home in State A, without having to perform any additional configurations of his or her devices or network connections. User 1 might make an express or implied request to an interconnection gateway device or other entity associated with the first service provider. The interconnection gateway device might request network connection information both from internal NFV entities and from external NFV entities (that are associated with the second service provider). Following the processes described above with respect to blocks 405-430, the interconnection gateway device can provide the appropriate VNFs to the user's devices and such to allow user 1 to have the same network functionalities for his or her user devices, which he or she is bringing to State B, as well as the same network functionalities for monitoring his or her home in State A, without having to perform any additional configurations of his or her devices or network connections.

In another example, for customer nomadic services, user 2, who is a resident of State C, might annually move to sunny State D during the winter time. In a manner similar to the above-described processes for customer roaming services for user 1, the interconnection gateway device can provide the appropriate VNFs to the user's devices and such to allow user 2 to have the same network functionalities for his or her user devices, which he or she is bringing to State D, as well as the same network functionalities for monitoring his or her home in State C, without having to perform any additional configurations of his or her devices or network connections.

These examples above are directed to user-based or user-focused NFV or VNF interconnection between two networks (operated by two different service providers). The various embodiments, however, are not so limited, and can utilize interconnection gateway functionality for other purposes not limited to the user-based or user-focused NFV or VNF interconnection. For example, for wholesale play, VNFs might be transferred from the network of one service provider to the network of another service provider, or VNFs may be exchanged between these networks, per agreements between the two service providers. For offloading, per similar agreements between service providers, when network capacity is beyond a certain predetermined threshold amount (such as during disaster situations or for disaster recovery), bursting of VNFs and/or data may be implemented via the established one or more links (such as the one or more links of block 425). For operator/service provider cooperation, similar agreements might provide for establishing the one or more links and/or for exchanging VNFs and data, etc.

Merely by way of example, in some aspects, method 400 might further comprise, at optional block 435, sending, with the interconnection gateway device and to at least one of the one or more external NFV entities (in some cases, via the second interconnection gateway device), a service catalog indicating at least one of a plurality of VNFs, a plurality of application programming interfaces ("APIs"), or a plurality of services offered by the one or more internal NFV entities. In some embodiments, the service catalog may be stored or may reside in one or more of data storage device 210 or 230 and/or a separate database that is located in the local network (not shown) that are associated with the owning service provider (i.e., the service provider owning, managing, or controlling the VNF(s)). In some cases, the data storage device 210 or 230 associated with the service provider that is associated with the internal NFV entities might store the service catalog. In some instances, the service catalog might be stored or may reside in data storage device 230 associated with the NFV resource manager 120 or the like. In some cases, the first set of abstracted network connection information might include fine-grained information that is hidden from the one or more external NFV entities, while the second set of abstracted network connection information include coarse-grained information that is public information (or that may be made public). The method 400 might further comprise certifying, with the interconnection gateway device, the one or more VNFs (optional block 440) and storing, with the interconnection gateway device, a record of the one or more VNFs that are certified in a database in communication with the interconnection gateway device (optional block 445). In some embodiments, certifying VNFs might include determining whether a particular VNF is actually a VNF that performs functions as ordered by a customer or as required by a service provider. In some instances, certifying VNFs might include determining whether a particular VNF is a rogue VNF (e.g., a surveillance VNF, spybot VNF, etc.) or an application or other virtual function that is disguised as the desired VNF; such certification processes might be part of security audits, which might be performed routinely or periodically. In some cases, certifying VNFs might include determining whether a legitimate VNF is the correct VNF for performing a desired function. In the event that the VNF being certified is not the desired or correct VNF for performing the desired function(s), the interconnection gateway device might request, locate, access, move, or provide access to another VNF, and might perform the certification process to determine whether the another VNF is the desired and correct VNF, prior to storing the VNF (at optional block 445). The process subsequently continues to optional block 450 in FIG. 4B, linked by circular marker denoted by "A."

At optional block 450, method 400 might comprise bursting at least one VNF of the one or more VNFs from a first pod to a second pod, based at least in part on one or more of time of day, geographic information, expected usage throughout a day, expected changes in usage throughout a day, one or more performance characteristics, changes in one or more performance characteristics, and/or the like. In some instances, each of the first pod and the second pod might comprise physical hardware resources that are part of one of an internal NFV entity of the one or more internal NFV entities and/or an external NFV entity of the one or more external NFV entities. In some cases, each of the first pod and the second pod might comprise physical hardware resources that are only part of at least one internal NFV entity of the one or more internal NFV entities (i.e., the NFV entities associated with the first service provider that is providing the service; such as the first NFVI). This allows the service provider to shift resources based on demand, time of day, expected usage, etc.

In some embodiments, method 400 might further comprise, at optional block 455, determining whether service chaining is required (e.g., if only one VNF is required, no service chaining is necessary) and, if so, determining whether it is possible to service chain two or more VNFs together to provide a single network service—including, without limitation, identifying and locating each individual VNF to provide sub-functionalities of the desired network service, managing the VNFs so that they can be service chained together, and/or the like. Based on a determination that service chaining is required and that two or more VNFs can be service chained together to provide a single network service, the method, at optional block 460, might comprise service chaining two or more VNFs together to provide a single network service, either by service chaining at least one first service chained VNF provided by at least one internal NFV entity and at least one second service chained VNF provided by at least one external NFV entity, to provide the single network service (optional block 465) or by service chaining two or more VNFs that are provided by only one of at least one internal NFV entity or at least one external NFV entity, to provide the single network service (optional block 470). In one non-limiting example, four or five VNFs (regardless of which NFV entity each VNF is provided from) might be service chained together to perform the functions of a network router. In similar fashion, any number of VNFs (from any combination of NFV entities) may be service chained to perform any desired or ordered function. Service chaining and the processes outlined above related to service chaining may, in some cases, be performed by a NFV interconnection gateway or the like.

With reference to FIG. 4C, the process of providing access to the one or more VNFs (at block 430) might include one or more of the following. In some embodiments, providing access to the one or more VNFs might comprise providing at least one of the one or more internal NFV entities or the one or more external NFV entities with access to one or more VNFs running on the other of the one or more internal NFV entities or the one or more external NFV entities, without sending the one or more VNFs from the other of the one or more internal NFV entities or the one or more external NFV entities to the one of the one or more internal NFV entities or the one or more external NFV entities (block 475). Alternatively, providing access to the one or more VNFs might comprise sending one or more VNFs from one of the one or more internal NFV entities or the one or more external NFV entities to the other of the one or more internal NFV entities or the one or more external NFV entities, via the one or more links (block 480). In some cases, providing access to the one or more VNFs might comprise providing, via the interconnection gateway device, access to one or more VNFs via the one or more links (block 485). In some instances, providing access to the one or more VNFs might comprise providing access to one or more VNFs, via peering connection between each of the one or more internal NFV entities and a corresponding one of the one or more external NFV entities (block 490). Alternatively or additionally, providing access to the one or more VNFs might comprise bursting, using an API, one or more VNFs from one of the one or more internal NFV entities or the one or more external NFV entities to another of the one or more internal NFV entities or the one or more external NFV entities (block 495).

NFV Interconnection Hub Implementation

Figure 5:
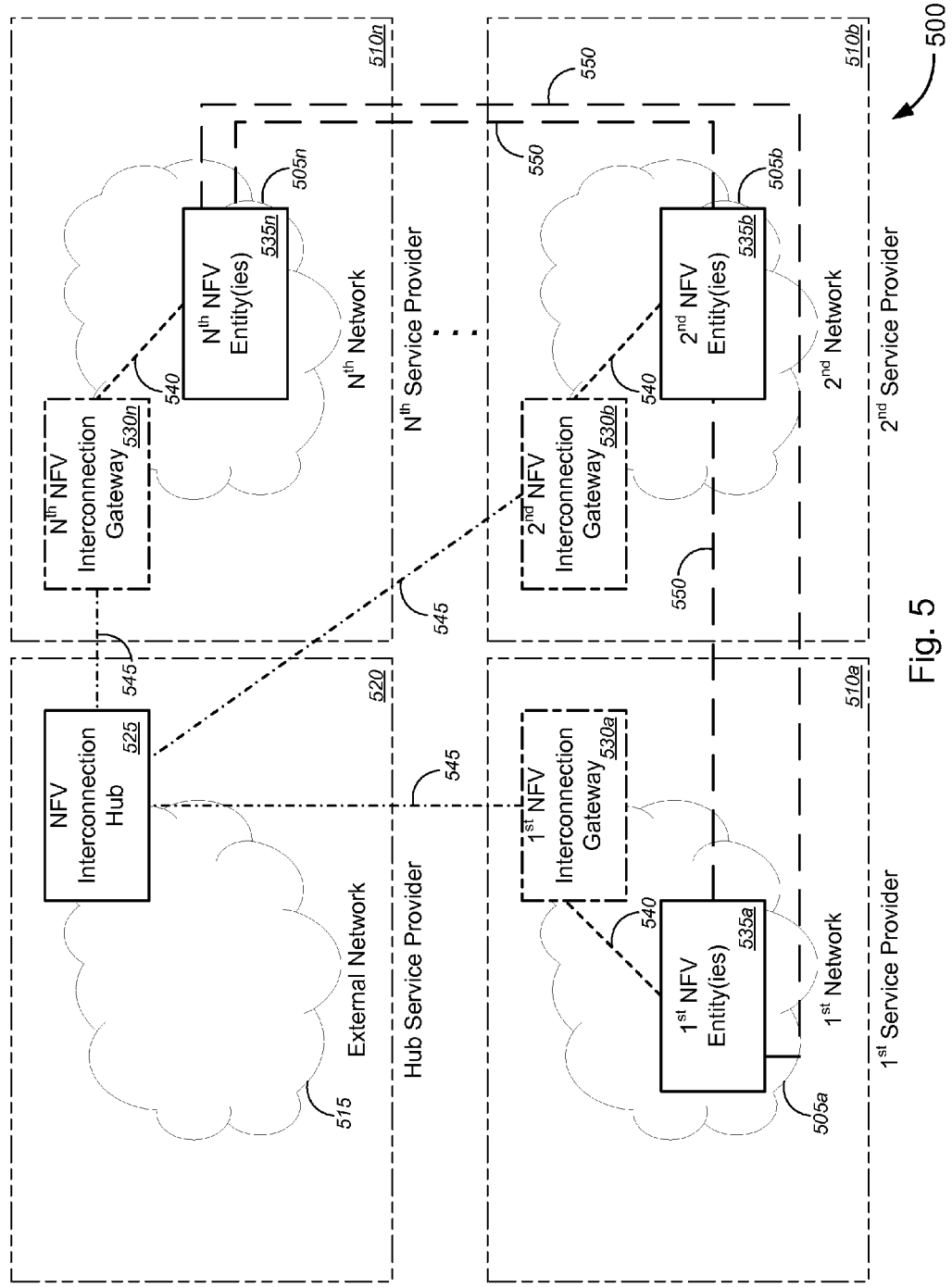
FIG. 5 is a schematic diagram illustrating a system for implementing interconnection hub functionality among a first set of NFV entities in a first network, a second set of NFV entities in a second network, through an $N^{th}$ set of NFV entities in an $N^{th}$ network, in accordance with various embodiments.

FIG. 5 is a schematic diagram illustrating a system for implementing interconnection hub functionality among a first set of NFV entities in a first network, a second set of NFV entities in a second network, through an $N^{th}$ set of NFV entities in an $N^{th}$ network, in accordance with various embodiments.

In the embodiment of FIG. 5, system 500 might comprise a first network 505a, a second network 505b, through an $N^{th}$ network 505n (collectively, "networks 505"), which are respectively associated with a first service provider 510a, a second service provider 510b, through an $N^{th}$ service provider 510n (collectively, "service providers 510"). System 500 might also comprise an external network 515 that is associated with a hub service provider 520. System 500 might further comprise an NFV interconnection hub 525 that is located in the external network 515. System 500 might additional comprise, associated with each service provider 510, an NFV interconnection gateway 530 (optional) and one or more NFV entities 535 that are located in the respective network 505. For example, an optional first NFV interconnection gateway 530a and one or more first NFV entities 535a might be located within the first network 505a, an optional second NFV interconnection gateway 530b and one or more second NFV entities 535b might be located within the second network 505b, and so on, through to an optional $N^{th}$ NFV interconnection gateway 530n and one or more $N^{th}$ NFV entities 535n being located within the $N^{th}$ network 505n.

According to some embodiments, each of the one or more first NFV entities 535a, the one or more second NFV entities 535b, through one or more $N^{th}$ NFV entities 535n might include, without limitation, one or more of a NFV resource manager (such as NFV resource manager 120), a NFV Infrastructure ("NFVI") system (such as first NFVI system 125a, second NFVI system 125b, etc.), a NFV orchestrator (such as NFV orchestrator 130, or the like), a NFV management and orchestration ("MANO") architectural framework or system (such as NFV MANO system 135, or the like), a virtual network function ("VNF") manager (such as VNF manager 140, or the like), a virtual infrastructure manager ("VIM") (such as VIM 145, or the like), and/or other NFV entities (such as other first NFV entities 150a, other second NFV entities 150b, etc.). In some instances, the NFV MANO system, the VNF manager, the VIM, and/or the other NFV entities might be part of the NFV orchestrator. In alternative instances, one or more of the NFV MANO system, the VNF manager, the VIM, and/or the other NFV entities might be separate from, but in communication with, the NFV orchestrator. In some cases, the other NFV entities might include, but are not limited to, a virtual machine ("VM"), a macro orchestrator, a domain orchestrator, a god orchestrator, and/or the like.

In some embodiments, each NFV interconnection gateway 530 might be an application running on a cloud platform, while in some cases might be part of any NFV entity that needs to interconnect with another NFV platform (e.g., MANO system, NFVI, VNF, etc.). In some instances, each interconnection gateway 530 might have both a physical component and a virtual component. The physical component might primarily be the physical interface between two or more networks of different service providers, while the virtual component might be an NFV entity that is hosted within the service provider's network. In some cases, it may be possible that each participating service provider could have an NFV hosted in its respective network, but that is not required. According to some embodiments, an NFV entity might be split into a portion completely under the control of an owning service provider. The owning service provider can then establish a set of functions that are available to other service providers via application programming interfaces ("APIs") to tailor their specific needs at the interconnection gateway. The owning service provider might ensure that the function(s) provided and the APIs provided enable functionality to other service providers, while also protecting the owning service provider network from nefarious activities. In general, the NFV interconnection gateway, which could be centralized or distributed within one network, might provide one-to-one NFV interconnection between two service provider networks.

Merely by way of example, in some aspects, NFV interconnection hub might be provided as a service, including, without limitation, various centralized services for NFV-based service providers to interconnect. In general, the NFV interconnection hub, which could be centralized or distributed within one network, might provide many-to-many NFV interconnection amongst a plurality of service provider networks (in some cases, amongst three or more service provider networks). In some embodiments, the many-to-many interconnection service can take the form of discovery and authentication (which is its simplest form). In alternative embodiments, the many-to-many interconnection service can take the form of a full blown hub for interconnection. In its simplest form, the NFV interconnection hub could be embodied as applications on a cloud platform. In some cases, the NFV interconnection hub, in its simplest form, might be embodied as a registry (or a more complex catalog). In more complex forms, the NFV interconnection hub could be similar to the full blown interconnect with instances of NFV interconnection gateways. In some instances, the NFV interconnection hub might be embodied as a hub device that utilizes actual interconnection and/or micro-peering amongst NFV entities in various different networks connected by the hub. According to some embodiments the interconnection hub might translate NFV-specific standards (e.g., translating FCAPS for one network service provider to FCAPS for a different network service provider). In some cases, the interconnection hub might determine how interconnection gateways establish interconnections. In some instances, the interconnection hub might function as a clearinghouse or possibly facilitate the NFVI optimization (in some cases, dynamically, and/or in real-time, establishing interconnections to NFV entities), possibly based on specifications established by a customer. According to some embodiments, the interconnection hub might establish an interconnection based on one or more of geolocation, usage, availability, budget, and/or functional requirements, or the like. In some embodiments, the interconnection hub might be federated or might be managed by a third party.

In operation, the NFV interconnection hub 525 might receive a first set of network connection information from at least one first NFV entity of the one or more first NFV entities 535a via links 545 (which are represented in FIG. 5 as dot-dash lines) that extend between the first network 505a and the external network 515—in some cases, via a first NFV interconnection gateway 530a (which may or may not be present in the first network 505a) via links 540 (which are represented in FIG. 5 as dash lines) between the at least one first NFV entity and the first NFV interconnection gateway 530a. Similarly, the NFV interconnection hub 525 might receive a second set of network connection information from at least one second NFV entity of the one or more second NFV entities 535b via links 545 (represented as dot-dash lines) that extend between the second network 505b and the external network 515—in some cases, via a second NFV interconnection gateway 530b (which may or may not be present in the second network 505b) via links 540 (represented as dash lines) between the at least one second NFV entity and the second NFV interconnection gateway 530b. And so on, with the NFV interconnection hub 525 receiving an $N^{th}$ set of network connection information from at least one $N^{th}$ NFV entity of the one or more $N^{th}$ NFV entities 535n via links 545 (represented as dot-dash lines) that extend between the $N^{th}$ network 505n and the external network 515—in some cases, via an $N^{th}$ NFV interconnection gateway 530n (which may or may not be present in the $N^{th}$ network 505n) via links 540 (represented as dash lines) between the at least one $N^{th}$ NFV entity and the $N^{th}$ NFV interconnection gateway 530n.

The NFV interconnection hub 525 might abstract each of the first set of network connection information, the second set of network connection information, through the $N^{th}$ set of network connection information to generate a first set of abstracted network connection information, a second set of abstracted network connection information, through an $N^{th}$ set of abstracted network connection information, respectively. The NFV interconnection hub 525 might establish one or more links 550 (which are represented in FIG. 5 as long dash lines) between one or more of at least one first NFV entity, at least one second NFV entity, through at least one $N^{th}$ NFV entity and corresponding one or more other of the at least one first NFV entity, the at least one second NFV entity, through the at least one $N^{th}$ NFV entity, based at least in part on one or more of the first set of abstracted network connection information, the second set of abstracted network connection information, or the $N^{th}$ set of abstracted network connection information.

The NFV interconnection hub 525 might subsequently provide access to one or more VNFs via the one or more links 550 (represented as long dash lines) that extend between one of the first network 505a, the second network 505b, through the $N^{th}$ network 505n and another of the first network 505a, the second network 505b, through the $N^{th}$ network 505n. In general, access can be either local access (e.g., a copy of the VNF is transferred to the NFV entity of one or more of the first through $N^{th}$ networks 505a-505n, and is run on resources in the one or more of the first through $N^{th}$ networks 505a-505n) or remote access (e.g., the VNF is run on the owning service provider's network resources (for example, the first network) and other NFV entities in other networks (e.g., NFV entities in the one or more of the second through $N^{th}$ networks 505b-505n) are provided with access to the VNF running on the owning service provider's network resources). In some cases, providing access to the one or more VNFs might include, without limitation, one or more of providing at least one of the one or more first NFV entities 535a, the one or more second NFV entities 535b, through the one or more $N^{th}$ NFV entities 535n with access to one or more VNFs running on one other of the one or more first NFV entities 535a, the one or more second NFV entities 535b, through the one or more $N^{th}$ NFV entities 535n, without sending the one or more VNFs from one to the other of the first, second, through $N^{th}$ NFV entities 535a-535n; sending one or more VNFs from one of the one or more first NFV entities 535a, the one or more second NFV entities 535b, through the one or more $N^{th}$ NFV entities 535n, to another of the one or more first NFV entities 535a, the one or more second NFV entities 535b, through the one or more $N^{th}$ NFV entities 535n, via the one or more links, or vice versa; providing access to the one or more VNFs via the one or more links comprises providing access, via the interconnection hub device 525, to one or more VNFs (in some cases, via the one or more links); providing access to one or more VNFs, via peering connection between the one of the one or more first NFV entities 535a, the one or more second NFV entities 535b, through the one or more $N^{th}$ NFV entities 535n and a corresponding one other of the one or more first NFV entities 535a, the one or more second NFV entities 535b, through the one or more $N^{th}$ NFV entities 535n; bursting, using an application programming interface ("API"), one or more VNFs from one of the one or more first NFV entities 535a, the one or more second NFV entities 535b, through the one or more $N^{th}$ NFV entities 535n, to another of the one or more first NFV entities 535a, the one or more second NFV entities 535b, through the one or more $N^{th}$ NFV entities 535n, or vice versa; and/or the like.

Merely by way of example, in some embodiments, each of one or more first NFV entities 535a, each of one or more second NFV entities 535b, or each of one or more $N^{th}$ NFV entities 535n might be without the capacity and/or capability to locally execute the one or more VNFs, and might comprise a device that is configured to request execution of VNFs and to access the VNFs being executed on corresponding one other of the one or more first NFV entities 535a, the one or more second NFV entities 535b, or the one or more $N^{th}$ NFV entities 535n.

Figure 6:
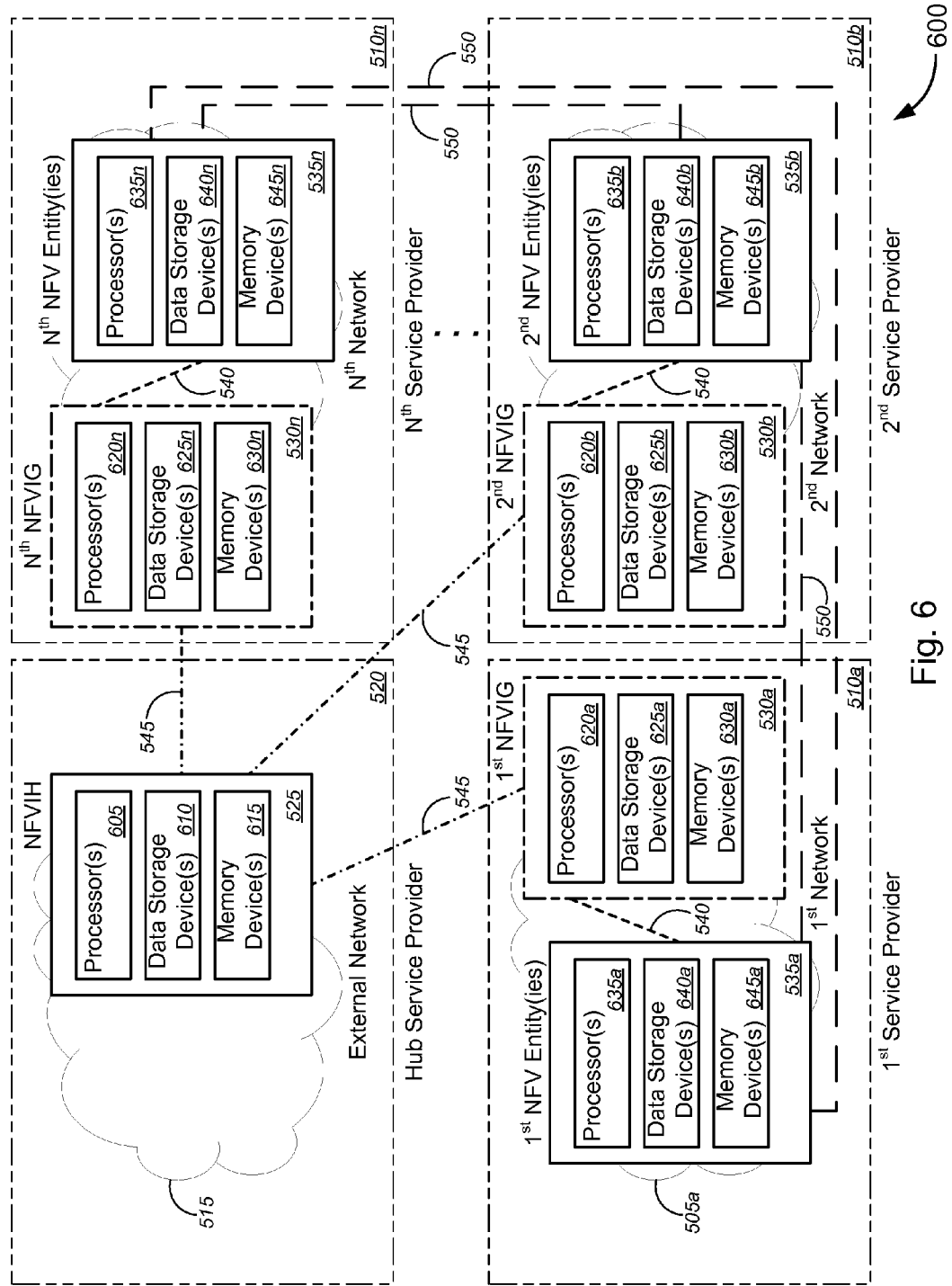
FIG. 6 is a schematic diagram illustrating another system for implementing interconnection hub functionality among a first set of NFV entities in a first network, a second set of NFV entities in a second network, through an $N^{th}$ set of NFV entities in an $N^{th}$ network, in accordance with various embodiments.

FIG. 6 is a schematic diagram illustrating another system for implementing interconnection hub functionality among a first set of NFV entities in a first network, a second set of NFV entities in a second network, through an $N^{th}$ set of NFV entities in an $N^{th}$ network, in accordance with various embodiments. FIG. 6 is similar to the embodiment of FIG. 5, except that FIG. 6 depicts processors, data storage devices, and memory devices within the NFV interconnection hub device 525, within each of the NFV interconnection gateway devices 530, and within each of the NFV entities 535. In particular, as shown in FIG. 6, the NFV interconnection hub device 525 might include, without limitation, a processor(s) 605, a data storage device(s) 610, and a memory device(s) 615 that are all interconnected with each other. The data storage device(s) 610 might store data that is transmitted or received from the NFV interconnection hub 525, while the memory device(s) 615 might be a non-transitory computer readable medium that stores computer software comprising a set of instructions that, when executed by the processor(s) 605, causes the interconnection hub device 525 to perform one or more functions (such as those as described herein with respect to FIGS. 5 and 9A-9E, or the like).

The first NFV interconnection gateway device 530a might include, without limitation, a processor(s) 620a, a data storage device(s) 625a, and a memory device(s) 630a that are all interconnected with each other. Likewise, the second NFV interconnection gateway device 530b might include, without limitation, a processor(s) 620b, a data storage device(s) 625b, and a memory device(s) 630b that are all interconnected with each other. In a similar manner, $N^{th}$ NFV interconnection gateway device 530n might include, without limitation, a processor(s) 620n, a data storage device(s) 625n, and a memory device(s) 630n that are all interconnected with each other. The data storage device(s) 625 might store data that is transmitted or received from the NFV interconnection gateway 530, while the memory device(s) 630 might be a non-transitory computer readable medium that stores computer software comprising a set of instructions that, when executed by the corresponding processor(s) 620, causes the corresponding interconnection gateway device 530 to perform one or more functions (such as those as described herein with respect to FIGS. 1A, 1B, and 4A-4C, or the like).

In a similar manner, each of the first NFV entity(ies) 535$a$ might include, but is not limited to, a processor(s) 635$a$, a data storage device(s) 640$a$, and a memory device(s) 645$a$ that are all interconnected with each other. Likewise, each of the second NFV entity(ies) 535$b$ might include, but is not limited to, a processor(s) 635$b$, a data storage device(s) 640$b$, and a memory device(s) 645$b$ that are all interconnected with each other. In a similar manner, each of the $N^{th}$ NFV entity(ies) 535$n$ might include, but is not limited to, a processor(s) 635$n$, a data storage device(s) 640$n$, and a memory device(s) 645$n$ that are all interconnected with each other. The data storage device(s) 640 might store data that is transmitted or received from the corresponding NFV entity(ies) 535, while the memory device(s) 645 might each be a non-transitory computer readable medium that stores computer software comprising a set of instructions that, when executed by the corresponding processor(s) 635, causes the particular NFV entity 535 to perform one or more functions (such as those as described herein with respect to FIGS. 1A, 1B, 4A-4C, 5, and 9A-9E or the like).

The techniques and configurations of FIG. 6 are otherwise similar, if not identical to, the techniques and configurations as described above with respect to FIG. 5, and the descriptions of the embodiment of FIG. 5 may similarly be applicable to those of the embodiment of FIG. 6 (unless incompatible, inconsistent, or otherwise stated as being different).

Figure 7:
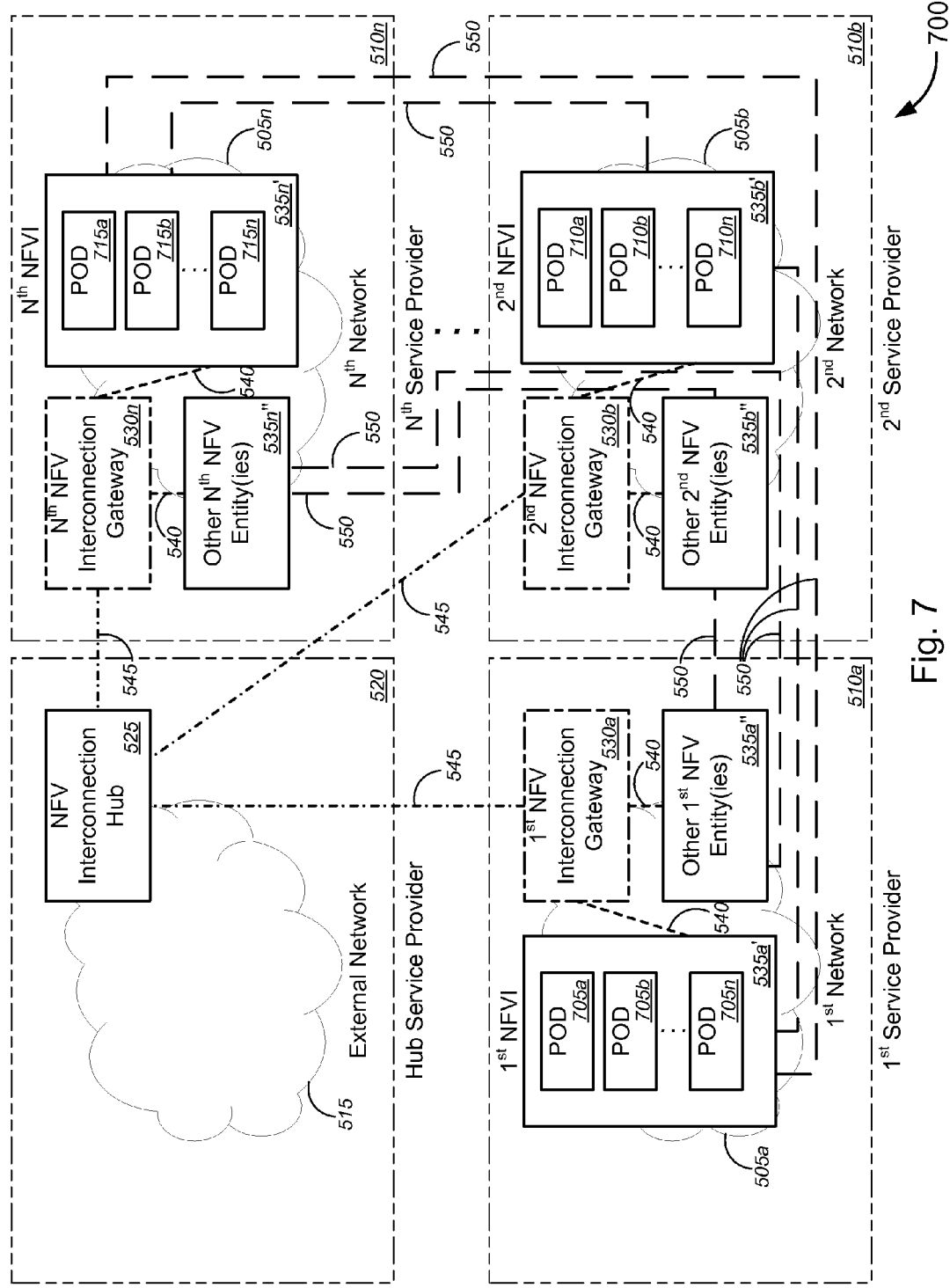
FIG. 7 is a schematic diagram illustrating yet another system for implementing interconnection hub functionality among a first set of NFV entities in a first network, a second set of NFV entities in a second network, through an $N^{th}$ set of NFV entities in an $N^{th}$ network, in accordance with various embodiments.

FIG. 7 is a schematic diagram illustrating yet another system for implementing interconnection hub functionality among a first set of NFV entities in a first network, a second set of NFV entities in a second network, through an $N^{th}$ set of NFV entities in an $N^{th}$ network, in accordance with various embodiments. FIG. 7 is similar to the embodiment of FIG. 5, except that FIG. 7 depicts a plurality of pods in each of at least one first NFV entity 535$a$, at least one second NFV entity 535$b$, through at least one $N^{th}$ NFV entity 535$n$. In the embodiment of FIG. 7, the one or more first NFV entities 535$a$ of FIG. 5 might comprise a first NFVI system(s) 535$a'$ and one or more other first NFV entities 535$a''$, while the one or more second NFV entities 535$b$ of FIG. 5 might comprise a second NFVI system(s) 535$b'$ and one or more other second NFV entities 535$b''$, and the one or more $N^{th}$ NFV entities 535$n$ of FIG. 5 might comprise an $N^{th}$ NFVI system(s) 535$n'$ and one or more other $N^{th}$ NFV entities 535$n''$.

The first NFVI system 535$a'$ might include a first pod 705$a$, a second pod 705$b$, through an $N^{th}$ pod 705$n$ (collectively, "pods 705"), while the second NFVI system 535$b'$ might include a first pod 710$a$, a second pod 710$b$, through an $N^{th}$ pod 710$n$ (collectively, "pods 710"), and so on, with the $N^{th}$ NFVI system 535$n'$ including a first pod 715$a$, a second pod 715$b$, through an $N^{th}$ pod 715$n$ (collectively, "pods 715"). In some embodiments, each pod might represent and/or include physical hardware resources that are part of the first, second, and/or $N^{th}$ NFVI system 535$a'$-535$n'$ or that are part of an external NFV entity (i.e., an NFV entity that is external to the first NFV entities 535$a$, the second NFV entities 535$b$, or the $N^{th}$ NFV entities 535$n$, or that is external to the first, second, through $N^{th}$ networks 505$a$-505$n$), or the like. In some cases, each pod might represent a rack of network communications equipment (e.g., compute resource, storage resource, etc.) within a telecommunications facility associated with one of the service providers 510.

In operation, the NFV interconnection hub device 525 might burst at least one VNF from a first pod to a second pod, based at least in part on one or more of time of day, geographic usage throughout a day, one or more performance characteristics (including, without limitation, latency, jitter, bandwidth, compute resource usage, storage resource usage, memory resource usage, and/or the like), or changes in one or more performance characteristics, and/or the like. In some embodiments, the first and second pods might be within only one of the first NFVI system 535$a'$, the second NFVI system 535$b'$, or the $N^{th}$ NFVI system 535$n'$, to provide the respective first service provider 510$a$, second service provider 510$b$, or the $N^{th}$ service provider 510$n$ with functionality (via the NFV interconnection hub device 525) to burst the at least one VNF internally among its own physical hardware resources, especially if said service provider does not have a corresponding NFV interconnection gateway 530 in its network 505. In alternative embodiments, the interconnection hub device 525 might burst the at least one VNF from any of the pods 705$a$-705$n$, 710$a$-710$n$, and 715$a$-715$n$ to any other of the pods 705$a$-705$n$, 710$a$-710$n$, and 715$a$-715$n$. Bursting to a pod in a different network 505 might allow for more localized execution of VNFs closer to a customer.

Although each of the first NFVI 535$a'$, the second NFVI 535$b'$, through the $N^{th}$ NFVI 535$n'$ is depicted as a single component in the corresponding network, this is merely to simplify illustration, but the various embodiments are not so limited, and each NFVI 535$a'$-535$n'$ may be embodied as any suitable number of NFVI systems within its respective network 505. In some embodiments, each of the NFVI systems 535$a'$-535$n'$ might include, without limitation, hardware resources located at a customer premises (e.g., hardware resources in network equipment at a residential customer premises; hardware resources in other wireless or wireline customer premises equipment ("CPE"); resources in a customer's mobile devices or other user devices; hardware resources in telecommunications closet(s) or room(s) at a multi-dwelling unit; hardware resources in telecommunications closet(s) or room(s) at a commercial customer premises; and/or the like), at a digital subscriber line access multiplexer ("DSLAM") (e.g., hardware resources in telecommunications or equipment rack(s) at the DSLAM; and/or the like), at a central office ("CO") (e.g., hardware resources in telecommunications rack(s) at the CO; and/or the like), at a point of presence ("POP") with the network, at a Tera-POP (i.e., a POP that is capable of terabit per second (i.e., at least 1 trillion bits per second) data transfer speeds), or the like.

In a non-limiting example, based on information regarding usage at different times of day, geographic usage throughout a day, one or more performance characteristics (including, without limitation, latency, jitter, bandwidth, compute resource usage, storage resource usage, memory resource usage, and/or the like), or changes in one or more performance characteristics, and/or the like, the interconnection hub device 525 might burst VNFs associated with a user's business or work to pods within the user's work premises or at a DSLAM or CO that is local to the user's work premises, just before the user typically arrives at work (e.g., between about 6 a.m. and 8 a.m. on weekday mornings). During the user's typical lunch break, the interconnection hub device 525 might burst VNFs associated with the user's media content (e.g., media content playback VNFs, etc.), news resources (e.g., news gathering VNFs, sports information gathering VNFs, etc.), and/or the like to pods within the user's work premises (if the user typically eats at work), to a DSLAM or CO that is local to the user's work premises (if the user typically eats at or near work), or the like. After the user's typical lunch hour, the interconnection hub device 525 might burst VNFs associated with the user's media content, news resources, and/or the like to pods at the CO, POP, Tera-POP, or the like. When the user typical leaves work (e.g., for home; such as after 6 p.m.), the interconnection hub device 525 might burst the VNFs associated with the user's media content, news resources, and/or the like to pods at the user's residential premises, at a DSLAM or CO near the user's residential premises, and/or the like, and might burst the VNFs associated with the user's business or work to pods at the CO, POP, Tera-POP, or the like. In the middle of the night (e.g., between 11 p.m. and 5 a.m.), the interconnection hub device 525 might burst VNFs associated with backup software applications to pods that are closer to the user's work premises and/or to the user's residential premises, to back up the user's work and/or personal/entertainment data, or the like. Also in the middle of the night, the interconnection hub device 525 might burst VNFs associated with third party computational cycles to pods closer to the user's work premises and/or the user's residential premises, to utilize unused or underutilized compute and/or data storage resources, or the like.

In these various examples, the user's work premises and the user's residential premises (or more precisely, user devices or computing systems at each of these locations) and/or each of the DSLAM, CO, POP, Tera-POP, or the like might be connected or associated with one of the first network 505a, the second network 505b, or the $N^{th}$ network 505n. In alternative embodiments, the user's work premises (or more precisely, user devices or computing systems at the work premises) might be connected or associated with one of the first network 505a, the second network 505b, or the $N^{th}$ network 505n, while the user's residential premises (or more precisely, user devices or computing systems at the residential premises) might be connected or associated with another of the first network 505a, the second network 505b, or the $N^{th}$ network 505n. In some embodiments, one or more of the DSLAM, CO, POP, Tera-POP, or the like might be connected or associated with one of the first network 505a, the second network 505b, or the $N^{th}$ network 505n, while one or more others of the DSLAM, CO, POP, Tera-POP, or the like might be connected or associated with another of the first network 505a, the second network 505b, or the $N^{th}$ network 505n.

The techniques and configurations of FIG. 7 are otherwise similar, if not identical to, the techniques and configurations as described above with respect to FIG. 5, and the descriptions of the embodiment of FIG. 5 may similarly be applicable to those of the embodiment of FIG. 7 (unless incompatible, inconsistent, or otherwise stated as being different).

In the embodiments described above with respect to FIGS. 5-7, one interconnection hub 525 communicates with and establishes links among a plurality of NFV entities 535 (in some cases, via corresponding NFV interconnection gateway devices 530, if any) in a corresponding plurality of networks 505. The various embodiments, however, are not limited to such configuration or interconnection, and two or more interconnection hubs (each individually being in communication with and establishing links among separate pluralities of NFV entities in corresponding plurality of networks) might interconnect in a hub-to-hub manner, in some cases, in a hub-to-hub-to-hub manner, and so on (collectively, "hub-to-hub"), or the like, as described in detail below with respect to FIG. 8.

Figure 8:
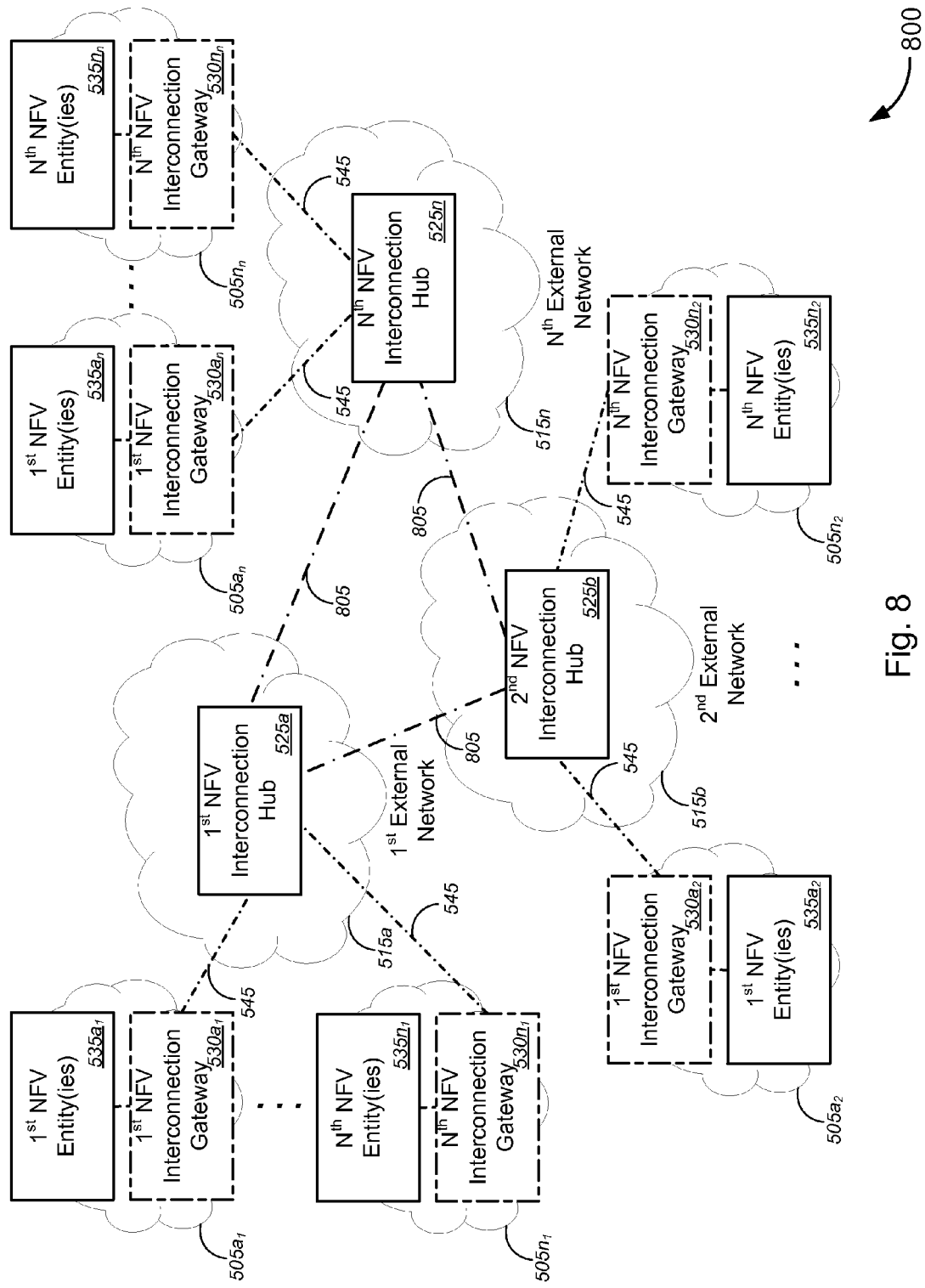
FIG. 8 is a schematic diagram illustrating a system for implementing hub-to-hub interconnection among a first interconnection hub in a first external network, a second interconnection hub in a second external network, through an $N^{th}$ interconnection hub in an $N^{th}$ external network, in accordance with various embodiments.

We now turn to FIG. 8, which is a schematic diagram illustrating a system for implementing hub-to-hub interconnection among a first interconnection hub in a first external network, a second interconnection hub in a second external network, through an $N^{th}$ interconnection hub in an $N^{th}$ external network, in accordance with various embodiments.

As shown in the embodiment of FIG. 8, system 800 might comprise a plurality of NFV interconnection hub devices 525, which might include, without limitation, a first NFV interconnection hub device 525a, a second NFV interconnection hub device 525b, through an $N^{th}$ NFV interconnection hub device 525n (collectively, "NFV interconnection hub devices 525"), which are associated with a first external network 515a, a second external network 515b, through an $N^{th}$ external network 515n, respectively (collectively, "external networks 515"). Each of the NFV interconnection hub devices 525 might communicate with and establish links among a plurality of NFV entities 535 (in some cases, via corresponding NFV interconnection gateway devices 530, if any) in a corresponding plurality of networks 505, in a manner similar to that as described above with respect to FIGS. 5-7. Particularly, the first NFV interconnection hub device 525a might communicate with and establish links among one or more first through $N^{th}$ NFV entities $535a_1$-$535n_1$ (in some cases, via corresponding NFV interconnection gateway devices $530a_1$-$530n_1$, if present) in a corresponding plurality of networks $505a_1$-$505n_1$. Similarly, the second NFV interconnection hub device 525b might communicate with and establish links among one or more first through $N^{th}$ NFV entities $535a_2$-$535n_2$ (in some cases, via corresponding NFV interconnection gateway devices $530a_2$-$530n_2$, if present) in a corresponding plurality of networks $505a_2$-$505n_2$. Likewise, the $N^{th}$ NFV interconnection hub device 525n might communicate with and establish links among one or more first through $N^{th}$ NFV entities $535a_n$-$535n_n$ (in some cases, via corresponding NFV interconnection gateway devices $530a_n$-$530n_n$, if present) in a corresponding plurality of networks $505a_n$-$505n_n$.

In operation, each NFV interconnection hub device 525 might communicate with one or more other NFV interconnection hub devices 525a-525n via links 805. In this manner, links 550 might be established by one or more interconnection hub devices 525 among any two or more NFV entities among the NFV entities $535a_1$-$535n_1$, $535a_2$-$535n_2$, through $535a_n$-$535n_n$, in some cases via corresponding NFV interconnection gateway devices $530a_1$-$530n_1$, $530a_2$-$530n_2$, through $530a_n$-$530n_n$, if present, and via links 540 and/or 545 and via links 805. In some embodiments, one of the NFV interconnection hub devices 525 might burst at least one VNF from a first pod to a second pod, based at least in part on one or more of time of day, geographic usage throughout a day, one or more performance characteristics (including, without limitation, latency, jitter, bandwidth, compute resource usage, storage resource usage, memory resource usage, and/or the like), or changes in one or more performance characteristics, and/or the like. In some embodiments, the first and second pods might be within one NFVI system among the NFVI systems 535a'-535n' in one of networks $505a_1$-$505n_1$, networks $505a_2$-$505n_2$, or networks $505a_n$-$505n_n$. In alternative embodiments, one of the NFV interconnection hub devices 525 might burst the at least one VNF from any of the pods 705a-705n, 710a-710n, and 715a-715n in any one of networks $505a_1$-$505n_1$, networks $505a_2$-$505n_2$, or networks $505a_n$-$505n_n$ to any other of the pods 705a-705n, 710a-710n, and 715a-715n in any one of networks $505a_1$-$505n_1$, networks $505a_2$-$505n_2$, or networks $505a_n$-$505n_n$, including bursting between or among pods at any level of customer work/residential premises, DSLAM, CO, POP, Tera-POP, etc. at each or any of these networks $505a_1$-$505n_1$, $505a_2$-$505n_2$, and/or $505a_n$-$505n_n$, or the like.

The techniques and configurations of FIG. 8 are otherwise similar, if not identical to, the techniques and configurations as described above with respect to FIGS. 5-7, and the descriptions of the embodiment of FIGS. 5-7 may similarly be applicable to those of the embodiment of FIG. 8 (unless incompatible, inconsistent, or otherwise stated as being different).

Figure 9A:
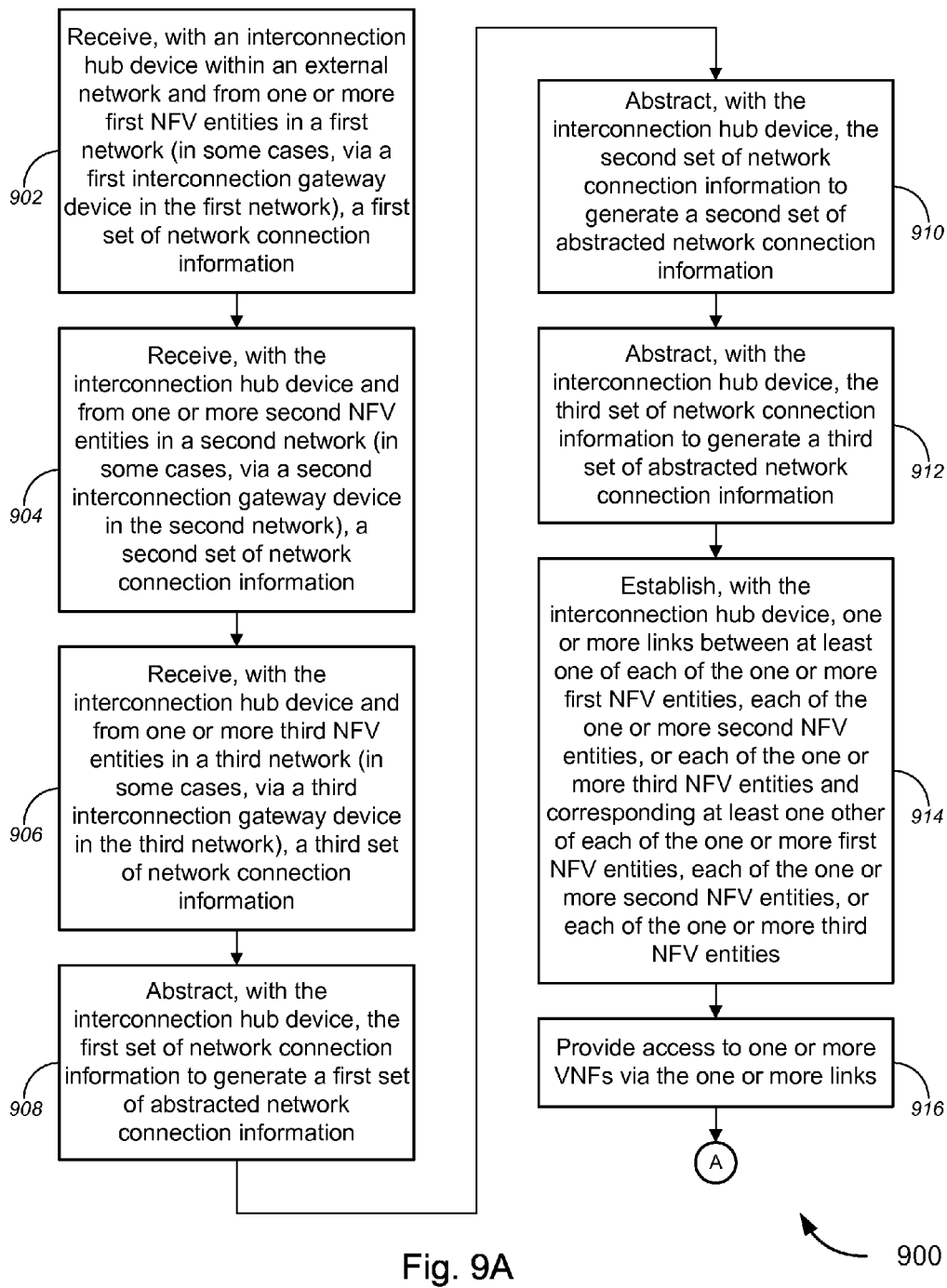
FIGS. 9A-9E are flow diagrams illustrating a method for implementing interconnection hub functionality among a first set of NFV entities in a first network, a second set of NFV entities in a second network, through an $N^{th}$ set of NFV entities in an $N^{th}$ network or for implementing hub-to-hub interconnection among a first interconnection hub in a first external network, a second interconnection hub in a second external network, through an N$^{th}$ interconnection hub in an N$^{th}$ external network, in accordance with various embodiments.
Figure 9B:
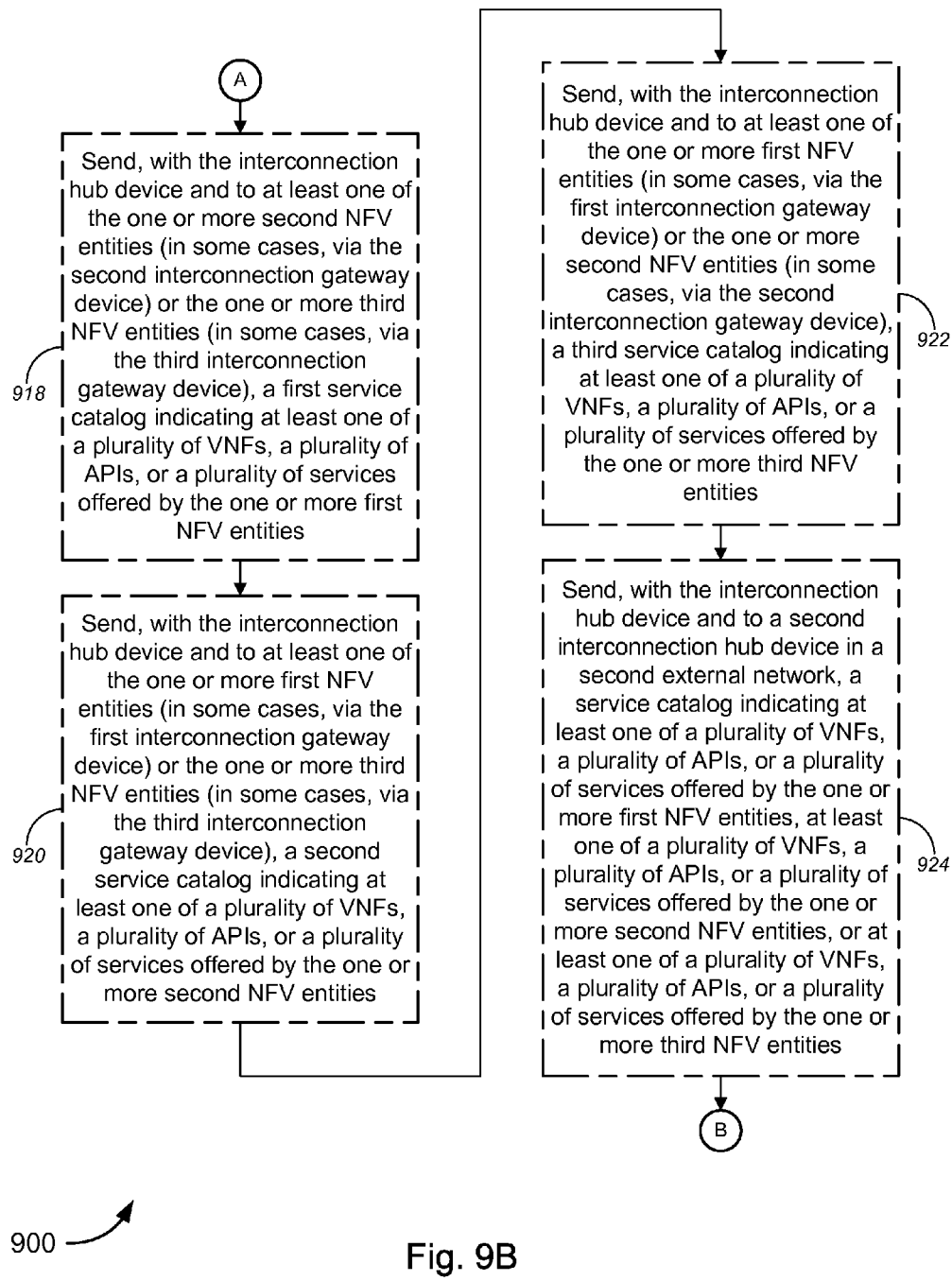
Figure 9C:
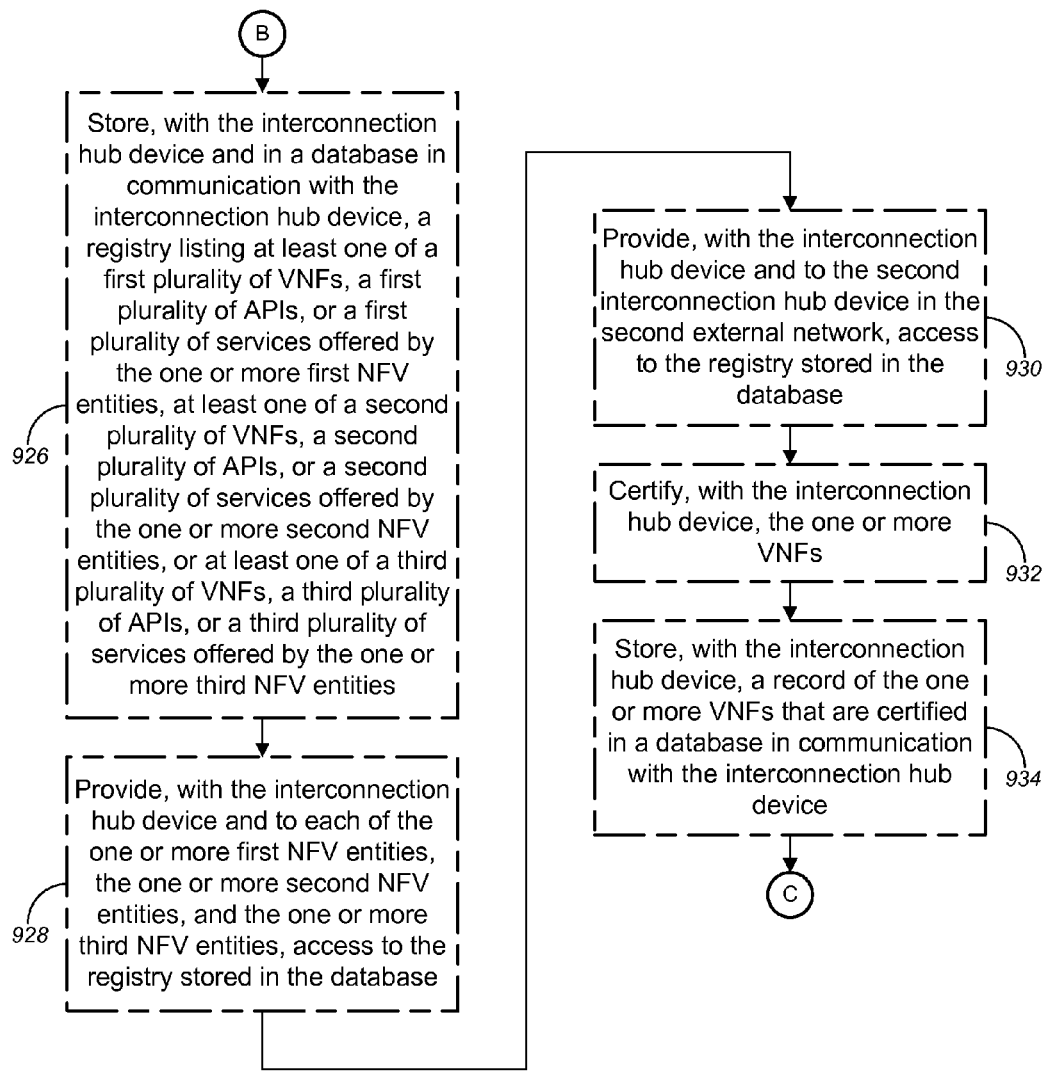
Figure 9D:
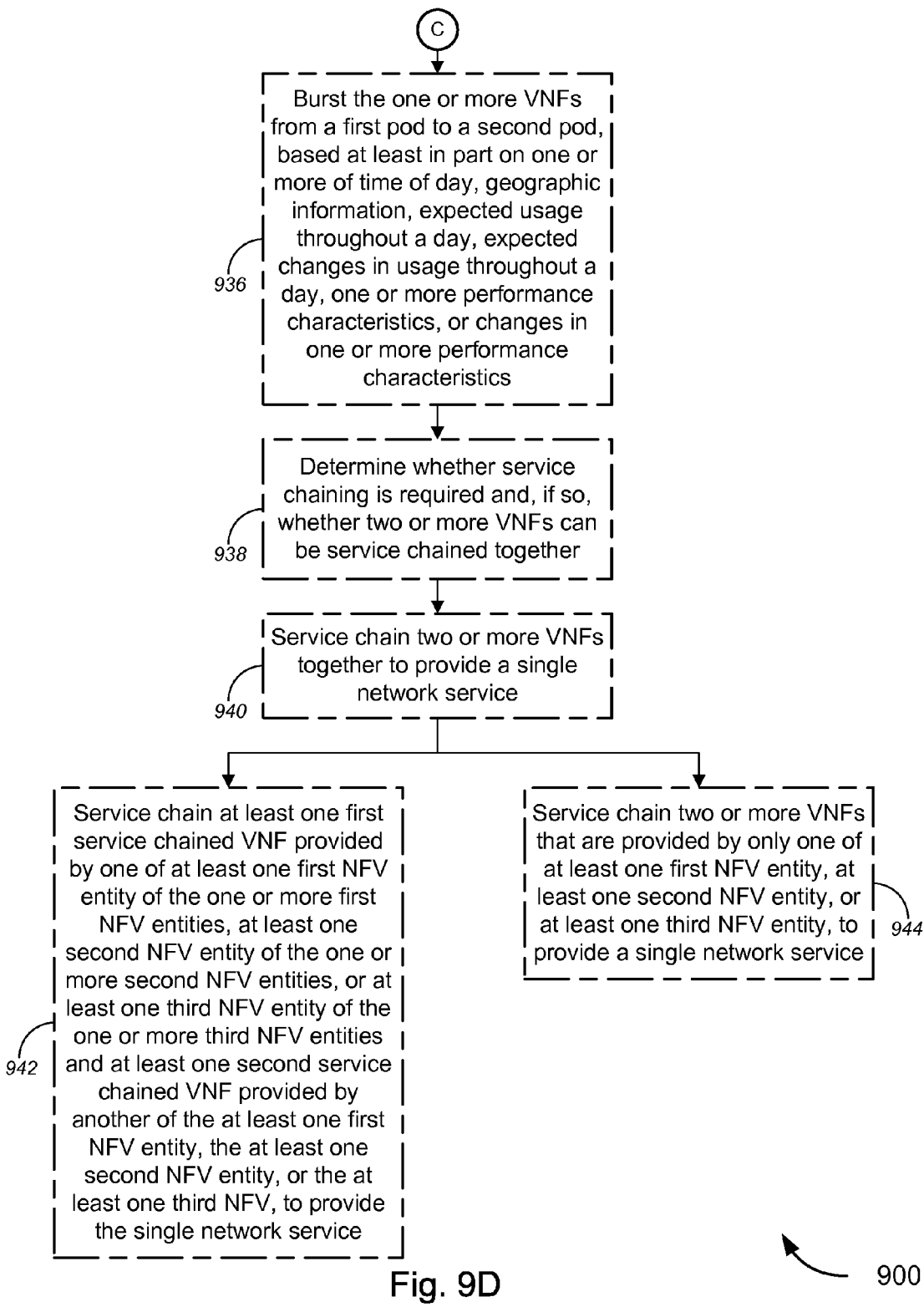
Figure 9E:
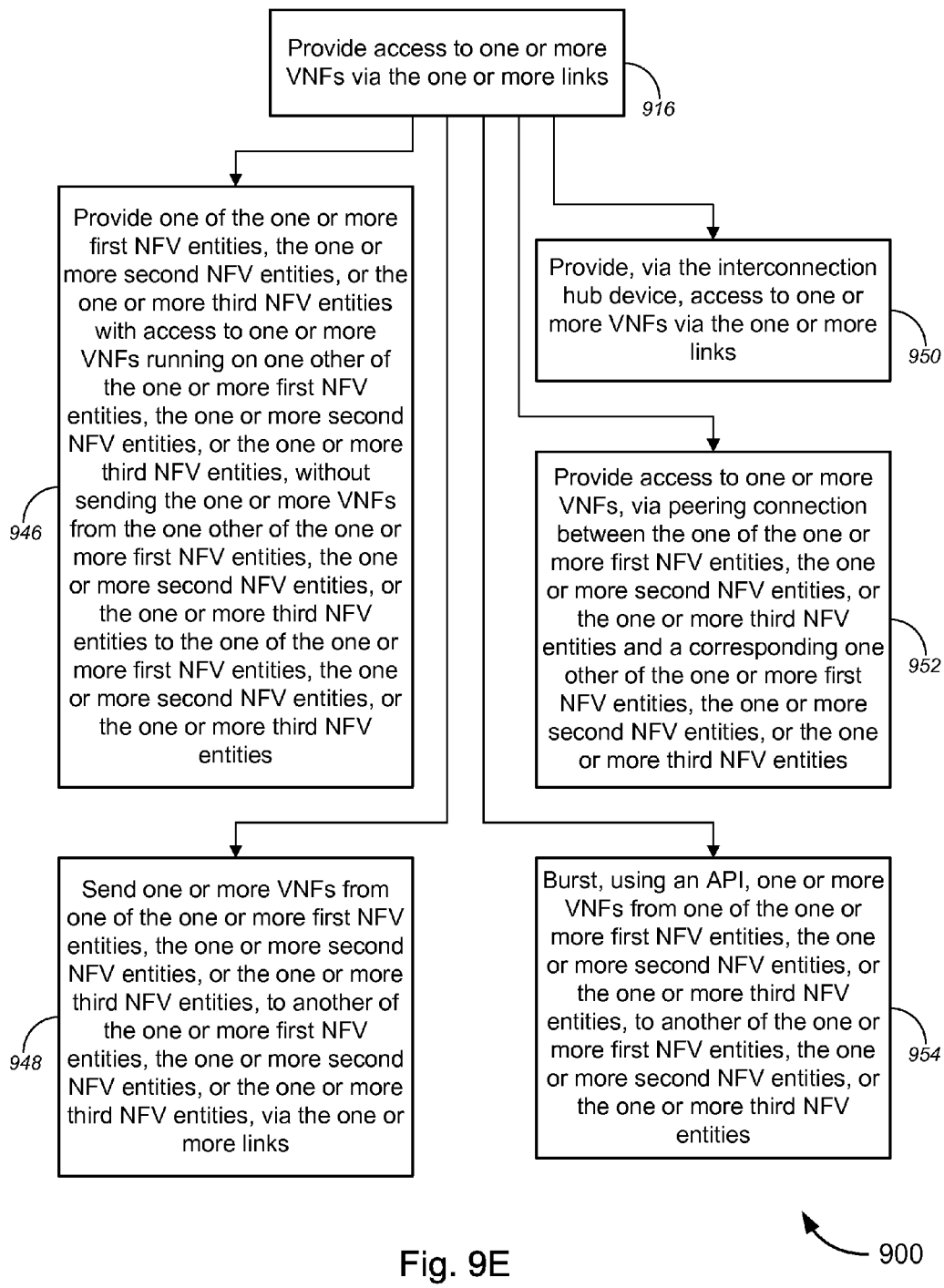

FIGS. 9A-9E (collectively, "FIG. 9") are flow diagrams illustrating a method for implementing interconnection hub functionality among a first set of NFV entities in a first network, a second set of NFV entities in a second network, through an $N^{th}$ set of NFV entities in an $N^{th}$ network or for implementing hub-to-hub interconnection among a first interconnection hub in a first external network, a second interconnection hub in a second external network, through an $N^{th}$ interconnection hub in an $N^{th}$ external network, in accordance with various embodiments. The embodiments as represented in FIG. 9 are merely illustrative and are not intended to limit the scope of the various embodiments. With reference to FIG. 9, method 900 in FIG. 9A continues onto FIG. 9B, linked by circular markers denoted by "A," continues from FIG. 9B to FIG. 9C, linked by circular marker denoted by "B," and continues from FIG. 9C to FIG. 9D, linked by circular marker denoted by "C." FIG. 9E illustrates alternative embodiments for providing access to one or more VNFs in block 916 of FIG. 9A.

While the techniques and procedures are depicted and/or described in a certain order for purposes of illustration, it should be appreciated that certain procedures may be reordered and/or omitted within the scope of various embodiments. Moreover, while the method illustrated by FIG. 9 can be implemented by or with (and, in some cases, are described below with respect to) the systems 500-800 of FIGS. 5-8, respectively (or components thereof), such methods may also be implemented using any suitable hardware implementation. Similarly, while each of the systems 500-800 (and/or components thereof) of FIGS. 5-8, respectively, can operate according to the method illustrated by FIG. 9 (e.g., by executing instructions embodied on a computer readable medium), the systems 500-800 can each also operate according to other modes of operation and/or perform other suitable procedures.

In the embodiment of FIG. 9, method 900, at block 902, might comprise receiving, with an interconnection hub device within an external network and from one or more first network functions virtualization ("NFV") entities in a first network (in some cases, via a first interconnection gateway device in the first network), a first set of network connection information. At block 904, method 900 might comprise receiving, with the interconnection hub device and from one or more second NFV entities in a second network (in some cases, via a second interconnection gateway device in the second network), a second set of network connection information. Method 900 might further comprise, at block 906, receiving, with the interconnection hub device and from one or more third NFV entities in a third network (in some cases, via a third interconnection gateway device in the third network), a third set of network connection information. Each of the first, second, third, and external networks might be separate from others of the first, second, third, and external networks. According to some embodiments, the first network might be associated with a first service provider, the second network might be associated with a second service provider separate from the first service provider, the third network might be associated with a third service provider separate from each of the first service provider and the second service provider, and the external network might be associated with a hub service provider separate from each of the first service provider, the second service provider, and the third service provider.

In some cases, the first set of network connection information might comprise information regarding at least one of latency, jitter, bandwidth, packet loss, nodal connectivity, compute resources, storage resources, memory capacity, routing, operations support systems ("OSS"), or business support systems ("BSS"), additional services (e.g., firewall, security, parental control functionality, etc.), and/or the like. The second set of network connection information might comprise information regarding at least one of latency, jitter, bandwidth, packet loss, nodal connectivity, compute resources, storage resources, memory capacity, routing, OSS, or BSS, additional services (e.g., firewall, security, parental control functionality, etc.), and/or the like. Similarly, the third set of network connection information might comprise information regarding at least one of latency, jitter, bandwidth, packet loss, nodal connectivity, compute resources, storage resources, memory capacity, routing, OSS, or BSS, additional services (e.g., firewall, security, parental control functionality, etc.), and/or the like. In some instances, the first set of network connection information, the second set of network connection information, and/or the third set of network connection information might each, alternatively or additionally, comprise information regarding at least one of fault, configuration, accounting, performance, or security ("FCAPS"), which might include, without limitation, fault isolation/zoning/trouble ticketing, service ordering/information organization/information hiding, billing/accounting, QoS/other performance characteristics (jitter, latency, bandwidth, etc.)/performance in view of service level agreements ("SLAs")/reporting, or authentication/authorization/accounting ("AAA"), respectively.

In some embodiments, method 900 might further comprise abstracting, with the interconnection hub device, the first set of network connection information to generate a first set of abstracted network connection information (block 908), abstracting, with the interconnection hub device, the second set of network connection information to generate a second set of abstracted network connection information (block 910), and abstracting, with the interconnection hub device, the third set of network connection information to generate a third set of abstracted network connection information (block 912). In some cases, each of the first set of abstracted network connection information, the second set of abstracted network connection information, and the third set of abstracted network connection information might be abstracted to be independent of any particular NFV entity in any network. In other words, the abstracted network connection information is abstracted so as to be readable or understandable by any computing system or network component, and is not information that is only readable or understandable (i.e., does not use proprietary information formats or the like) by particular kinds, by particular brands of NFV entities, by particular products made by a particular manufacturer, or by particular products operated or maintained by a particular service provider. In this manner, universal communication and/or interconnection may be achieved between different NFV entities (i.e., NFV entities manufactured, operated, and/or maintained by particular parties, or the like).

At block 914, method 900 might comprise establishing, with the interconnection hub device, one or more links between at least one of each of the one or more first NFV entities, each of the one or more second NFV entities, or each of the one or more third NFV entities and corresponding at least one other of each of the one or more first NFV entities, each of the one or more second NFV entities, or each of the one or more third NFV entities, based at least in part on one or more of the first set of abstracted network connection information, the second set of abstracted network connection information, or the third set of abstracted network connection information. Method 900 might further comprise, at block 916, providing access to one or more virtualized network functions ("VNFs") via the one or more links, different embodiments of which are described below with respect to FIG. 9E.

In some cases, the one or more links might be established between at least one of the first service provider, the second service provider, or the third service provider and corresponding at least one other of the first service provider, the second service provider, or the third service provider, via the interconnection hub device, to establish interconnection for providing at least one of customer roaming services, customer nomadic services, wholesale play, disaster recovery, offloading, service bureau operations, or network operator/service provider cooperation. In a similar manner as described above with respect to FIG. 4, for example, for customer roaming services, user 1, who is a customer of the first service provider and who is resident in State A, might travel to State B for a vacation or for a business trip. It is assumed for this example that the first service provider does not offer the same range of services in State B, and that a second service provider (which is unaffiliated with the first service provider) operates in State B. User 1 might desire to have the same network functionalities for his or her user devices, which he or she is bringing to State B, as well as the same network functionalities for monitoring his or her home in State A, without having to perform any additional configurations of his or her devices or network connections. User 1 might make an express or implied request to an interconnection hub device (in some cases, via an interconnection gateway device) or other entity associated with the first service provider. The interconnection hub device might request network connection information both from first NFV entities in the first network and from second NFV entities (that are associated with the second service provider, in some cases via a second NFV interconnection gateway device in the second network). Following the processes described above with respect to blocks 902-916, the interconnection hub device can provide the appropriate VNFs to the user's devices and such (in some cases, via the interconnection gateway device(s)) to allow user 1 to have the same network functionalities for his or her user devices, which he or she is bringing to State B, as well as the same network functionalities for monitoring his or her home in State A, without having to perform any additional configurations of his or her devices or network connections.

In another example, for customer nomadic services, user 2, who is a resident of State C, might annually move to sunny State D during the winter time. In a manner similar to the above-described processes for customer roaming services for user 1, the interconnection hub device can provide the appropriate VNFs to the user's devices and such to allow user 2 to have the same network functionalities for his or her user devices, which he or she is bringing to State D, as well as the same network functionalities for monitoring his or her home in State C, without having to perform any additional configurations of his or her devices or network connections.

These examples above are directed to user-based or user-focused NFV or VNF interconnection between two networks (operated by two different service providers). The various embodiments, however, are not so limited, and can utilize interconnection hub functionality for other purposes not limited to the user-based or user-focused NFV or VNF interconnection. For example, for wholesale play, VNFs might be transferred from the network of one service provider to the network of another service provider (or a group(s) of service providers), or VNFs may be exchanged between/among these networks, per agreements between the three or more service providers (or groups of service providers). For offloading, per similar agreements between/among service providers (or groups of service providers), when network capacity is beyond a certain predetermined threshold amount (such as during disaster situations or for disaster recovery), bursting of VNFs and/or data may be implemented via the established one or more links (such as the one or more links of block 914). For operator/service provider cooperation, similar agreements might provide for establishing the one or more links and/or for exchanging VNFs and data, etc. The process subsequently continues to optional block 918 in FIG. 9B, linked by circular marker denoted by "A."

At optional block 918, in some aspects, method 900 might further comprise sending, with the interconnection hub device and to at least one of the one or more second NFV entities (in some cases, via the second interconnection gateway device) or the one or more third NFV entities (in some cases, via the third interconnection gateway device), a first service catalog indicating at least one of a plurality of VNFs, a plurality of application programming interfaces ("APIs"), or a plurality of services offered by the one or more first NFV entities. Method 900, at optional block 920, might comprise sending, with the interconnection hub device and to at least one of the one or more first NFV entities (in some cases, via the first interconnection gateway device) or the one or more third NFV entities, a second service catalog indicating at least one of a plurality of VNFs, a plurality of APIs, or a plurality of services offered by the one or more second NFV entities. Method 900 might further comprise sending, with the interconnection hub device and to at least one of the one or more first NFV entities (in some cases, via the first interconnection gateway device) or the one or more second NFV entities (in some cases, via the second interconnection gateway device), a third service catalog indicating at least one of a plurality of VNFs, a plurality of APIs, or a plurality of services offered by the one or more third NFV entities (optional block 922). The method 900 might further comprise, at optional block 924, sending, with the interconnection hub device and to a second interconnection hub device in a second external network, a service catalog indicating at least one of the first plurality of VNFs, the first plurality of APIs, or the first plurality of services offered by the one or more first NFV entities, at least one of the second plurality of VNFs, the second plurality of APIs, or the second plurality of services offered by the one or more second NFV entities, and/or at least one of the third plurality of VNFs, the third plurality of APIs, or the third plurality of services offered by the one or more third NFV entities. In some embodiments, the respective service catalog may be stored or may reside in one or more of data storage device 610, data storage device 625 or 640, and/or a separate database that is located in the external network or a corresponding local network (not shown) that are associated with the owning service provider (i.e., the service provider owning, managing, or controlling the VNF(s)). In some cases, the data storage device 625 or 640 associated with the service provider that is associated with the particular or local NFV entities might store the service catalog. In some instances, the service catalog might be stored or may reside in data storage device 640 associated with a NFV resource manager (such as NFV resource manager 120 or the like that may be one of the NFV entities 535), which might be associated with the NFV interconnection hub 525 or with one of the NFV interconnection gateways 530. The process subsequently continues to optional block 926 in FIG. 9C, linked by circular marker denoted by "B."

At optional block 926, according to some embodiments, method 900 might comprise storing, with the interconnection hub device and in a database in communication with the interconnection hub device, a registry listing at least one of a first plurality of VNFs, a first plurality of APIs, or a first plurality of services offered by the one or more first NFV entities, at least one of a second plurality of VNFs, a second plurality of APIs, or a second plurality of services offered by the one or more second NFV entities, or at least one of a third plurality of VNFs, a third plurality of APIs, or a third plurality of services offered by the one or more third NFV entities. The method 900 might further comprise providing, with the interconnection hub device and to each of the one or more first NFV entities, the one or more second NFV entities, and the one or more third NFV entities, access to the registry stored in the database (optional block 928).

Method 900, at optional block 930, might comprise providing, with the interconnection hub device and to the second interconnection hub device in the second external network, access to the registry stored in the database. The method 900 might further comprise certifying, with the interconnection hub device, the one or more VNFs (optional block 932) and storing, with the interconnection hub device, a record of the one or more VNFs that are certified in a database in communication with the interconnection hub device (optional block 934). In some embodiments, certifying VNFs might include determining whether a particular VNF is actually a VNF that performs functions as ordered by a customer or as required by a service provider. In some instances, certifying VNFs might include determining whether a particular VNF is a rogue VNF (e.g., a surveillance VNF, spybot VNF, etc.) or an application or other virtual function that is disguised as the desired VNF; such certification processes might be part of security audits, which might be performed routinely or periodically. In some cases, certifying VNFs might include determining whether a legitimate VNF is the correct VNF for performing a desired function. In the event that the VNF being certified is not the desired or correct VNF for performing the desired function(s), the interconnection hub device might request, locate, access, move, or provide access to another VNF, and might perform the certification process to determine whether the another VNF is the desired and correct VNF, prior to storing the VNF (at optional block 934). The process subsequently continues to optional block 936 in FIG. 9D, linked by circular marker denoted by "C."

At optional block 936, method 900 might comprise bursting the one or more VNFs from a first pod to a second pod, based at least in part on one or more of time of day, geographic information, expected usage throughout a day, expected changes in usage throughout a day, one or more performance characteristics, changes in one or more performance characteristics, and/or the like. In some instances, each of the first pod and the second pod comprises physical hardware resources that are part of one of a first NFV entity of the one or more first NFV entities, a second NFV entity of the one or more second NFV entities, and/or a third NFV entity of the one or more third NFV entities. In some cases, each of the first pod and the second pod might comprise physical hardware resources that are only part of one of at least one first NFV entity of the one or more first NFV entities (i.e., the NFV entity(ies) associated with the first service provider that is providing the service; such as the first NFVI), at least one second NFV entity of the one or more second NFV entities (i.e., the NFV entity(ies) associated with the second service provider that is providing the service; such as the second NFVI), or at least one third NFV entity of the one or more third NFV entities (i.e., the NFV entity(ies) associated with the third service provider that is providing the service; such as the third NFVI). This allows the particular service provider (i.e., the first, second, or third service provider) to shift resources based on demand, time of day, expected usage, etc.

In some embodiments, method 900 might further comprise, at optional block 938, determining whether service chaining is required (e.g., if only one VNF is required, no service chaining is necessary) and, if so, determining whether it is possible to service chain two or more VNFs together to provide a single network service—including, without limitation, identifying and locating each individual VNF to provide sub-functionalities of the desired network service, managing the VNFs so that they can be service chained together, and/or the like. Based on a determination that service chaining is required and that two or more VNFs can be service chained together to provide a single network service, the method, at optional block 940, might comprise service chaining two or more VNFs together to provide a single network service, either by service chaining at least one first service chained VNF provided by one of at least one first NFV entity of the one or more first NFV entities, at least one second NFV entity of the one or more second NFV entities, or at least one third NFV entity of the one or more third NFV entities and at least one second service chained VNF provided by another of the at least one first NFV entity, the at least one second NFV entity, or the at least one third NFV entity, to provide the single network service (optional block 942) or by service chaining two or more VNFs that are provided by only one of at least one first NFV entity of the one or more first NFV entities, at least one second NFV entity of the one or more second NFV entities, or at least one third NFV entity of the one or more third NFV entities, to provide the single network service (optional block 944). In one non-limiting example, four or five VNFs (regardless of which NFV entity each VNF is provided from) might be service chained together to perform the functions of a network router. In similar fashion, any number of VNFs (from any combination of NFV entities) may be service chained to perform any desired or ordered function. Service chaining and the processes outlined above related to service chaining may, in some cases, be performed by a NFV interconnection gateway, a NFV interconnection hub, and/or the like.

With reference to FIG. 9E, the process of providing access to the one or more VNFs (at block 916) might include one or more of the following. In some embodiments, providing access to the one or more VNFs might comprise providing at least one of the one or more first NFV entities, the one or more second NFV entities, or the one or more third NFV entities with access to one or more VNFs running on one other of the one or more first NFV entities, the one or more second NFV entities, or the one or more third NFV entities, without sending the one or more VNFs from the one other of the one or more first NFV entities, the one or more second NFV entities, or the one or more third NFV entities to the one of the one or more first NFV entities, the one or more second NFV entities, or the one or more third NFV entities (block 946). Alternatively, providing access to the one or more VNFs might comprise sending one or more VNFs from one of the one or more first NFV entities, the one or more second NFV entities, or the one or more third NFV entities, to another of the one or more first NFV entities, the one or more second NFV entities, or the one or more third NFV entities, via the one or more links (block 948).

In some cases, providing access to the one or more VNFs might comprise providing access to the one or more VNFs via the one or more links comprises providing, via the interconnection hub device, access to one or more VNFs via the one or more links (block 950). In some instances, providing access to the one or more VNFs might comprise providing access to one or more VNFs, via peering connection between the one of the one or more first NFV entities, the one or more second NFV entities, or the one or more third NFV entities and a corresponding one other of the one or more first NFV entities, the one or more second NFV entities, or the one or more third NFV entities (block 952). Alternatively or additionally, providing access to the one or more VNFs might comprise bursting, using an API, one or more VNFs from one of the one or more first NFV entities, the one or more second NFV entities, or the one or more third NFV entities, to another of the one or more first NFV entities, the one or more second NFV entities, or the one or more third NFV entities (block 954).

Exemplary System and Hardware Implementation

FIG. 10 is a block diagram illustrating an exemplary computer or system hardware architecture, in accordance with various embodiments. FIG. 10 provides a schematic illustration of one embodiment of a computer system 1000 of the service provider system hardware that can perform the methods provided by various other embodiments, as described herein, and/or can perform the functions of interconnection gateway devices 115 and/or 530, interconnection hub devices 525, NFV entities 120-150, 220, and/or 535, hardware pods 305, 310, and/or 705-715, user devices or computing systems in communication with any of these network devices, or the like, as described above. It should be noted that FIG. 10 is meant only to provide a generalized illustration of various components, of which one or more (or none) of each may be utilized as appropriate. FIG. 10, therefore, broadly illustrates how individual system elements may be implemented in a relatively separated or relatively more integrated manner.

The computer or hardware system 1000—which might represent an embodiment of the interconnection gateway devices 115 and/or 530, interconnection hub devices 525, NFV entities 120-150, 220, and/or 535, hardware pods 305, 310, and/or 705-715, user devices or computing systems in communication with any of these network devices, or of any other device, as described above with respect to FIGS. 1-9—is shown comprising hardware elements that can be electrically coupled via a bus 1005 (or may otherwise be in communication, as appropriate). The hardware elements may include one or more processors 1010, including, without limitation, one or more general-purpose processors and/or one or more special-purpose processors (such as digital signal processing chips, graphics acceleration processors, and/or the like); one or more input devices 1015, which can include, without limitation, a mouse, a keyboard and/or the like; and one or more output devices 1020, which can include, without limitation, a display device, a printer, and/or the like.

The computer or hardware system 1000 may further include (and/or be in communication with) one or more storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 1000 might also include a communications subsystem 1030, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1030 may permit data to be exchanged with a network (such as the network described below, to name one example), with other computer or hardware systems, and/or with any other devices described herein. In many embodiments, the computer or hardware system 1000 will further comprise a working memory 1035, which can include a RAM or ROM device, as described above.

The computer or hardware system 1000 also may comprise software elements, shown as being currently located within the working memory 1035, including an operating system 1040, device drivers, executable libraries, and/or other code, such as one or more application programs 1045, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1025 described above. In some cases, the storage medium might be incorporated within a computer system, such as the system 1000. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 1000 and/or might take the form of source and/or installable code, which, upon compilation and/or installation on the computer or hardware system 1000 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 1000) to perform methods in accordance with various embodiments of the invention. According to a set of embodiments, some or all of the procedures of such methods are performed by the computer or hardware system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer readable medium, such as one or more of the storage device(s) 1025. Merely by way of example, execution of the sequences of instructions contained in the working memory 1035 might cause the processor(s) 1010 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 1000, various computer readable media might be involved in providing instructions/code to processor(s) 1010 for execution and/or might be used to store and/or carry such instructions/code (e.g., as signals). In many implementations, a computer readable medium is a non-transitory, physical, and/or tangible storage medium. Such a medium may take many forms, including, but not limited to, non-volatile media, volatile media, and transmission media. Non-volatile media includes, for example, optical and/or magnetic disks, such as the storage device(s) 1025. Volatile media includes, without limitation, dynamic memory, such as the working memory 1035. Transmission media includes, without limitation, coaxial cables, copper wire and fiber optics, including the wires that comprise the bus 1005, as well as the various components of the communication subsystem 1030 (and/or the media by which the communications subsystem 1030 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 1000. These signals, which might be in the form of electromagnetic signals, acoustic signals, optical signals, and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a storage device 1025 either before or after execution by the processor(s) 1010.

As noted above, a set of embodiments comprises methods and systems for implementing interconnection gateway and/or hub functionalities between or among two or more network functions virtualization ("NFV") entities that are located in different networks. FIG. 11 illustrates a schematic diagram of a system 1100 that can be used in accordance with one set of embodiments. The system 1100 can include one or more user computers or user devices 1105. A user computer or user device 1105 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer or user device 1105 can also have any of a variety of applications, including one or more applications configured to perform methods provided by various embodiments (as described above, for example), as well as one or more office applications, database client and/or server applications, and/or web browser applications. Alternatively, a user computer or user device 1105 can be any other electronic device, such as a thin-client computer, Internet-enabled mobile telephone, and/or personal digital assistant, capable of communicating via a network (e.g., the network(s) 1110 described below) and/or of displaying and navigating web pages or other types of electronic documents. Although the exemplary system 1100 is shown with three user computers or user devices 1105, any number of user computers or user devices can be supported.

Certain embodiments operate in a networked environment, which can include a network(s) 1110. The network(s) 1110 can be any type of network familiar to those skilled in the art that can support data communications using any of a variety of commercially-available (and/or free or proprietary) protocols, including, without limitation, TCP/IP, SNAT™ IPX™, AppleTalk™, and the like. Merely by way of example, the network(s) 1110 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1115. Each of the server computers 1115 may be configured with an operating system, including, without limitation, any of those discussed above, as well as any commercially (or freely) available server operating systems. Each of the servers 1115 may also be running one or more applications, which can be configured to provide services to one or more clients 1105 and/or other servers 1115.

Merely by way of example, one of the servers 1115 might be a data server, a web server, a cloud computing device(s), or the like, as described above. The data server might include (or be in communication with) a web server, which can be used, merely by way of example, to process requests for web pages or other electronic documents from user computers 1105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1105 to perform methods of the invention.

The server computers 1115, in some embodiments, might include one or more application servers, which can be configured with one or more applications accessible by a client running on one or more of the client computers 1105 and/or other servers 1115. Merely by way of example, the server(s) 1115 can be one or more general purpose computers capable of executing programs or scripts in response to the user computers 1105 and/or other servers 1115, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer or user device 1105 and/or another server 1115. In some embodiments, an application server can perform one or more of the processes for implementing NFV interconnection gateway and/or hub functionalities, or the like, as described in detail above. Data provided by an application server may be formatted as one or more web pages (comprising HTML, JavaScript, etc., for example) and/or may be forwarded to a user computer 1105 via a web server (as described above, for example). Similarly, a web server might receive web page requests and/or input data from a user computer 1105 and/or forward the web page requests and/or input data to an application server. In some cases, a web server may be integrated with an application server.

In accordance with further embodiments, one or more servers 1115 can function as a file server and/or can include one or more of the files (e.g., application code, data files, etc.) necessary to implement various disclosed methods, incorporated by an application running on a user computer 1105 and/or another server 1115. Alternatively, as those skilled in the art will appreciate, a file server can include all necessary files, allowing such an application to be invoked remotely by a user computer or user device 1105 and/or server 1115.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1120. The location of the database(s) 1120 is discretionary: merely by way of example, a database 1120a might reside on a storage medium local to (and/or resident in) a server 1115a (and/or a user computer or user device 1105). Alternatively, a database 1120b can be remote from any or all of the computers 1105, 1115, so long as it can be in communication (e.g., via the network 1110) with one or more of these. In a particular set of embodiments, a database 1120 can reside in a storage-area network ("SAN") familiar to those skilled in the art. (Likewise, any necessary files for performing the functions attributed to the computers 1105, 1115 can be stored locally on the respective computer and/or remotely, as appropriate.) In one set of embodiments, the database 1120 can be a relational database, such as an Oracle database, that is adapted to store, update, and retrieve data in response to SQL-formatted commands. The database might be controlled and/or maintained by a database server, as described above, for example.

According to some embodiments, system 1100 might further comprise one or more NFV interconnection gateway device(s) 1125 and/or one or more NFV interconnection hub device(s) 1130, as described in detail above with respect to FIGS. 1-9. In some embodiments, one or more of the user device 1105a, the user device 1105b, the server 1115a, the server 1115b, the database 1120a, and/or the database 1120b might be in the same network 1110 as one of the NFV interconnection gateway device 1125 or the NFV interconnection hub device 1130. In alternative or additional embodiments, one or more of the user device 1105a, the user device 1105b, the server 1115a, the server 1115b, the database 1120a, and/or the database 1120b might be in a first network 1110 that is different from another network(s) 1110 in which each of the NFV interconnection gateway device 1125 or the NFV interconnection hub device 1130 is located.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, with an interconnection gateway device within a first network and from one or more internal network functions virtualization ("NFV") entities, a first set of network connection information, each of the one or more internal NFV entities being located within the first network;
receiving, with the interconnection gateway device and from one or more external NFV entities, a second set of network connection information, each of the one or more external NFV entities being located within a second network external to the first network;
abstracting, with the interconnection gateway device, the first set of network connection information to generate a first set of abstracted network connection information;
abstracting, with the interconnection gateway device, the second set of network connection information to generate a second set of abstracted network connection information, wherein each of the first set of abstracted network connection information and the second set of abstracted network connection information is abstracted such that the first set of abstracted network connection information and the second set of abstracted network connection information become independent of any particular NFV entity in any network;
establishing, with the interconnection gateway device, one or more links between each of the one or more internal NFV entities and each corresponding one of the one or more external NFV entities, based at least in part on one or more of the first set of abstracted network connection information or the second set of abstracted network connection information; and
providing access to one or more virtualized network functions ("VNFs") via the one or more links.

2. The method of claim 1, wherein the first network is associated with a first service provider, and the second network is associated with a second service provider separate from the first service provider.

3. The method of claim 2, wherein the one or more links are established between the first service provider and the second service provider to establish interconnection for providing at least one of customer roaming services, customer nomadic services, wholesale play, disaster recovery, offloading, service bureau operations, or network operator/service provider cooperation.

4. The method of claim 1, wherein providing access to the one or more VNFs via the one or more links comprises sending one or more VNFs from one of the one or more internal NFV entities or the one or more external NFV entities to the other of the one or more internal NFV entities or the one or more external NFV entities, via the one or more links.

5. The method of claim 1, wherein providing access to the one or more VNFs via the one or more links comprises providing at least one of the one or more internal NFV entities or the one or more external NFV entities with access to one or more VNFs running on the other of the one or more internal NFV entities or the one or more external NFV entities, without sending the one or more VNFs from the other of the one or more internal NFV entities or the one or more external NFV entities to the one of the one or more internal NFV entities or the one or more external NFV entities.

6. The method of claim 1, wherein each of the one or more internal NFV entities comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator.

7. The method of claim 1, wherein each of the one or more external NFV entities comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator.

8. The method of claim 1, wherein each of the one or more external NFV entities comprises a device that is configured to request execution of VNFs and to access the VNFs being executed on corresponding one of the one or more internal NFV entities, without at least one of capacity or capability to locally execute the VNFs.

9. The method of claim 1, wherein the interconnection gateway device comprises a physical gateway device, a gateway application hosted on a distributed computing platform, a gateway application hosted on a cloud computing platform, a VNF-based gateway application hosted on a centralized gateway hardware system, a gateway application hosted on a server, a VNF-based gateway application hosted on a computing device, or an external network-to-network interface ("E-NNI") device.

10. The method of claim 1, wherein the first set of network connection information comprises information regarding at least one of latency, jitter, bandwidth, packet loss, nodal connectivity, compute resources, storage resources, memory capacity, routing, operations support systems ("OSS"), or business support systems ("BSS"), and wherein the second set of network connection information comprises information regarding at least one of latency, jitter, bandwidth, packet loss, nodal connectivity, compute resources, storage resources, memory capacity, routing, OSS, or BSS.

11. The method of claim 1, wherein the first set of network connection information comprises information regarding at least one of fault, configuration, accounting, performance, or security ("FCAPS"), and wherein the second set of network connection information comprises information regarding at least one of fault, configuration, accounting, performance, or security ("FCAPS").

12. The method of claim 1, wherein providing access to the one or more VNFs via the one or more links comprises providing, via the interconnection gateway device, access to one or more VNFs via the one or more links.

13. The method of claim 1, wherein providing access to the one or more VNFs via the one or more links comprises providing access to one or more VNFs, via peering connection between each of the one or more internal NFV entities and a corresponding one of the one or more external NFV entities.

14. The method of claim 1, wherein providing access to the one or more VNFs via the one or more links comprises bursting, using an application programming interface ("API"), one or more VNFs from one of the one or more internal NFV entities or the one or more external NFV entities to another of the one or more internal NFV entities or the one or more external NFV entities.

15. The method of claim 1, further comprising:
bursting at least one VNF of the one or more VNFs from a first pod to a second pod, based at least in part on one or more of time of day, geographic information, expected usage throughout a day, expected changes in usage throughout a day, one or more performance characteristics, or changes in one or more performance characteristics, wherein each of the first pod and the second pod comprises physical hardware resources that are part of one of an internal NFV entity of the one or more internal NFV entities or an external NFV entity of the one or more external NFV entities.

16. The method of claim 1, further comprising:
service chaining two or more VNFs together to provide a single network service.

17. The method of claim 16, wherein the two or more VNFs comprise at least one first service chained VNF provided by at least one internal NFV entity of the one or more internal NFV entities and at least one second service chained VNF provided by at least one external NFV entity of the one or more external NFV entities, wherein service chaining the two or more VNFs together to provide a single network service comprises service chaining the at least one first service chained VNF and the at least one second service chained VNF together to provide the single network service.

18. The method of claim 16, wherein the two or more VNFs comprise two or more service chained VNFs provided by only one of at least one internal NFV entity of the one or more internal NFV entities or at least one external NFV entity of the one or more external NFV entities.

19. The method of claim 1, further comprising:
sending, with the interconnection gateway device and to at least one of the one or more external NFV entities, a service catalog indicating at least one of a plurality of VNFs, a plurality of application programming interfaces ("APIs"), or a plurality of services offered by the one or more internal NFV entities.

20. The method of claim 1, wherein receiving the second set of network connection information comprises receiving, with the interconnection gateway device, the second set of network connection information from the one or more external NFV entities via a second interconnection gateway device located within the second network.

21. The method of claim 20, further comprising:
sending, with the interconnection gateway device and to at least one of the one or more external NFV entities via the second interconnection gateway device, a service catalog indicating at least one of a plurality of VNFs, a plurality of application programming interfaces ("APIs"), or a plurality of services offered by the one or more internal NFV entities.

22. The method of claim 1, wherein the first set of abstracted network connection information include fine-grained information that is hidden from the one or more external NFV entities, and wherein the second set of abstracted network connection information include coarse-grained information that is public information.

23. The method of claim 1, further comprising:
certifying, with the interconnection gateway device, the one or more VNFs;
storing, with the interconnection gateway device, a record of the one or more VNFs that are certified in a database in communication with the interconnection gateway device.

24. A system, comprising:
an interconnection gateway device located within a first network, the interconnection gateway device comprising:
at least one first processor;
at least one first data storage device in communication with the at least one first processor, the at least one first data storage device having data stored thereon;
at least one first non-transitory computer readable medium in communication with the at least one first processor and with the at least one first data storage device, the at least one first non-transitory computer readable medium having stored thereon computer software comprising a first set of instructions that, when executed by the at least one first processor, causes the interconnection gateway device to perform one or more functions;
one or more internal network functions virtualization ("NFV") entities located within the first network, each of the one or more internal NFV entities comprising:
at least one second processor;
at least one second data storage device in communication with the at least one second processor, the at least one second data storage device having data stored thereon;
at least one second non-transitory computer readable medium in communication with the at least one second processor and with the at least one second data storage device, the at least one second non-transitory computer readable medium having stored thereon computer software comprising a second set of instructions that, when executed by the at least one second processor, causes the internal NFV entity to perform one or more functions, the second set of instructions comprising:
instructions for sending a first set of network connection information to the interconnection gateway device;
one or more external NFV entities located within a second network that is external to the first network, each of the one or more external NFV entities comprising:
at least one third processor;
at least one third data storage device in communication with the at least one third processor, the at least one third data storage device having data stored thereon;
at least one third non-transitory computer readable medium in communication with the at least one third processor and with the at least one third data storage device, the at least one third non-transitory computer readable medium having stored thereon computer software comprising a third set of instructions that, when executed by the at least one third processor, causes the external NFV entity to perform one or more functions, the third set of instructions comprising:
  instructions for sending a second set of network connection information to the interconnection gateway device;
wherein the first set of instructions comprises:
  instructions for receiving, from the one or more internal NFV entities, the first set of network connection information;
  instructions for receiving, from the one or more external NFV entities, the second set of network connection information;
  instructions for abstracting the first set of network connection information to generate a first set of abstracted network connection information;
  instructions for abstracting the second set of network connection information to generate a second set of abstracted network connection information, wherein each of the first set of abstracted network connection information and the second set of abstracted network connection information is abstracted to be such that the first set of abstracted network connection information and the second set of abstracted network connection information become independent of any particular NFV entity in any network;
  instructions for establishing one or more links between each of the one or more internal NFV entities and each corresponding one of the one or more external NFV entities, based at least in part on one or more of the first set of abstracted network connection information or the second set of abstracted network connection information; and
  instructions for providing access to one or more virtualized network functions ("VNFs") via the one or more links;
wherein the second set of instructions further comprises:
  instructions for accessing, sending, or receiving the one or more VNFs via the one or more links;
wherein the third set of instructions further comprises:
  instructions for accessing, receiving, or sending the one or more VNFs via the one or more links.

25. The system of claim 24, wherein the first network is associated with a first service provider, and the second network is associated with a second service provider separate from the first service provider.

26. The system of claim 24, wherein each of the one or more internal NFV entities comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator.

27. The system of claim 24, wherein each of the one or more external NFV entities comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator.

28. The system of claim 24, wherein the interconnection gateway device comprises a physical gateway device, a gateway application hosted on a distributed computing platform, a gateway application hosted on a cloud computing platform, a VNF-based gateway application hosted on a centralized gateway hardware system, a gateway application hosted on a server, a VNF-based gateway application hosted on a computing device, or an external network-to-network interface ("E-NNI") device.

29. The system of claim 24, wherein the first set of instructions further comprises:
  instructions for bursting at least one VNF of the one or more VNFs from a first pod to a second pod, based at least in part on one or more of time of day, geographic information, expected usage throughout a day, expected changes in usage throughout a day, one or more performance characteristics, or changes in one or more performance characteristics, wherein each of the first pod and the second pod comprises physical hardware resources that are part of one of an internal NFV entity of the one or more internal NFV entities or an external NFV entity of the one or more external NFV entities.

30. The system of claim 24, wherein the first set of instructions further comprises:
  instructions for service chaining two or more VNFs together to provide a single network service.

31. The system of claim 24, wherein the first set of instructions further comprises:
  instructions for sending, to at least one of the one or more external NFV entities, a service catalog indicating at least one of a plurality of VNFs, a plurality of application programming interfaces ("APIs"), or a plurality of services offered by the one or more internal NFV entities.

32. The system of claim 24, wherein the first set of instructions further comprises:
  instructions for certifying the one or more VNFs; and
  instructions for storing a record of the one or more VNFs that are certified in a database in communication with the interconnection gateway device.

33. An interconnection gateway device, comprising:
  at least one processor;
  at least one data storage device in communication with the at least one processor, the at least one data storage device having data stored thereon; and
  at least one non-transitory computer readable medium in communication with the at least one processor and the at least one data storage device, the at least one non-transitory computer readable medium having stored thereon computer software comprising a set of instructions that, when executed by the at least one processor, causes the interconnection gateway device to perform one or more functions, the set of instructions comprising:
    instructions for receiving, from one or more internal network functions virtualization ("NFV") entities, a first set of network connection information, each of the one or more internal NFV entities being located within the first network in which the interconnection gateway device is located;
    instructions for receiving, from one or more external NFV entities, a second set of network connection information, each of the one or more external NFV entities being located within a second network external to the first network;
    instructions for abstracting the first set of network connection information to generate a first set of abstracted network connection information;

instructions for abstracting the second set of network connection information to generate a second set of abstracted network connection information, wherein each of the first set of abstracted network connection information and the second set of abstracted network connection information is abstracted such that the first set of abstracted network connection information and the second set of abstracted network connection information become independent of any particular NFV entity in any network;

instructions for establishing one or more links between each of the one or more internal NFV entities and each corresponding one of the one or more external NFV entities, based at least in part on one or more of the first set of abstracted network connection information or the second set of abstracted network connection information; and instructions for providing access to one or more virtualized network functions ("VNFs") via the one or more links.

34. The interconnection gateway device of claim 33, wherein each of the one or more internal NFV entities comprises at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator.

35. The interconnection gateway device of claim 33, wherein the set of instructions further comprises:

instructions for bursting at least one VNF of the one or more VNFs from a first pod to a second pod, based at least in part on one or more of time of day, geographic information, expected usage throughout a day, expected changes in usage throughout a day, one or more performance characteristics, or changes in one or more performance characteristics, wherein each of the first pod and the second pod comprises physical hardware resources that are part of one of an internal NFV entity of the one or more internal NFV entities or an external NFV entity of the one or more external NFV entities.

36. The interconnection gateway device of claim 33, wherein the set of instructions further comprises:

instructions for service chaining two or more VNFs together to provide a single network service.

37. The interconnection gateway device of claim 33, wherein the set of instructions further comprises:

instructions for sending, to at least one of the one or more external NFV entities, a service catalog indicating at least one of a plurality of VNFs, a plurality of application programming interfaces ("APIs"), or a plurality of services offered by the one or more internal NFV entities.

38. The interconnection gateway device of claim 33, wherein the set of instructions further comprises:

instructions for certifying the one or more VNFs; and instructions for storing a record of the one or more VNFs that are certified in a database in communication with the interconnection gateway device.

* * * * *